United States Patent
DeLisio, Jr. et al.

(10) Patent No.: US 11,848,742 B2
(45) Date of Patent: *Dec. 19, 2023

(54) SATELLITE COMMUNICATIONS SOLID-STATE BLOCK UPCONVERTER WITH GAIN COMPENSATION

(71) Applicant: Mission Microwave Technologies, LLC, Cypress, CA (US)

(72) Inventors: Michael P. DeLisio, Jr., Monrovia, CA (US); Blythe C. Deckman, Eastvale, CA (US); Solomon Viveros, Riverside, CA (US)

(73) Assignee: MISSION MICROWAVE TECHNOLOGIES, LLC, Cypress, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/111,536

(22) Filed: Feb. 18, 2023

(65) Prior Publication Data

US 2023/0291464 A1 Sep. 14, 2023

Related U.S. Application Data

(63) Continuation of application No. 17/180,505, filed on Feb. 19, 2021, now Pat. No. 11,611,391.

(51) Int. Cl.
*H04B 7/185* (2006.01)
(52) U.S. Cl.
CPC ..... *H04B 7/18513* (2013.01); *H04B 7/18519* (2013.01)

(58) Field of Classification Search
CPC .............. H04B 7/18513; H04B 7/18519
See application file for complete search history.

(56) References Cited

U.S. PATENT DOCUMENTS

| | | | |
|---|---|---|---|
| 9,543,915 B1* | 1/2017 | Bonebright | H03F 3/68 |
| 11,611,391 B1* | 3/2023 | Delisio, Jr. | H04B 7/18513 |
| 2009/0175185 A1* | 7/2009 | Laish | H04B 7/18519 |
| | | | 370/252 |
| 2012/0164939 A1* | 6/2012 | Ito | H04W 88/04 |
| | | | 455/7 |
| 2017/0093344 A1* | 3/2017 | Mahon | H03F 3/45475 |
| 2018/0006615 A1* | 1/2018 | Halperin | H03F 3/245 |

* cited by examiner

*Primary Examiner* — Jae Y Lee
(74) *Attorney, Agent, or Firm* — Christopher P. Maiorana, PC

(57) ABSTRACT

An apparatus including a circuit, a temperature sensor, a sensor and a control system. The circuit may be configured to receive an input signal and a configuration signal and generate an output signal in response to performing an upconversion of the input signal to a selected frequency band and an amplification of the input signal in response to the configuration signal. The temperature sensor may be configured to measure a temperature. The sensor may be configured to measure a sensor value. The control system may be configured to generate the configuration signal in response to the temperature and the sensor value. The configuration signal may be generated to maintain a gain of the amplification at a target level over a range of an operating condition during the upconversion. The target level of the gain for the operating condition may be determined in response to a pre-determined calculation.

20 Claims, 9 Drawing Sheets

SATELLITE COMMUNICATIONS SOLID-STATE BLOCK UPCONVERTER WITH GAIN COMPENSATION

This application relates to U.S. Application Ser. No. 17/180,505, filed on Feb. 19, 2021, which is hereby incorporated by reference in its entirety.

FIELD OF THE INVENTION

The invention relates to communication systems generally and, more particularly, to a method and/or apparatus for implementing a satellite communications solid-state block upconverter with gain compensation.

BACKGROUND

Satellite communications (satcom) systems rely on a block upconverter (BUC) to transmit uplink signals from the ground to an orbiting satellite. The BUC upconverts a low-frequency intermediate frequency (IF) signal to a higher-frequency radio frequency (RF) signal. The BUC also amplifies a low-power IF signal to a high-power RF signal.

Satcom BUCs are typically used outdoors and must perform consistently over a broad range of ambient temperatures. A typical range for military or commercial upconverters is −40 C to 60 C. The performance of the solid-state components inside the BUC will vary with temperature, so some means of compensating for temperature changes is needed. For example, the gain (i.e., ratio of output power to input power) of a solid state amplifier will typically decrease as the temperature of the BUC increases. Since the BUC comprises many cascaded solid-state components, the overall gain of the BUC may vary considerably with the operating temperature. In a conventional BUC, settings for temperature compensation are typically determined by testing the unit in an environmental chamber that can heat or cool the ambient temperature as needed to attempt to keep the BUC gain constant as the external temperature varies. Typically, a single temperature sensor internal to the BUC is used to perform the calibration. However, this approach has drawbacks.

In order to maintain linearity and efficiency, solid-state amplifiers used in satcom BUCs are typically biased such that the power they draw from the main supply increases as the amplifiers are driven harder (i.e., a Class-AB bias). Generally, both the drawn power and the power dissipated as heat increase as the RF output power increases non-linearly. At very low RF output powers, the dissipated power remains fairly constant, but as the output power approaches the maximum saturated output that the device is capable of, the dissipated power can increase very rapidly. The ratio of the maximum to minimum dissipated power can be 5:1 or higher. In a typical satcom BUC, the final power amplifier (PA) is the most powerful amplifier, drawing and dissipating most of the power in the unit. As the final PA is driven into saturation, the dissipated power can increase considerably. Depending on the size and efficiency of the BUC, the PA near saturation may need to dissipate up to 1 kW more than when the output is backed off to very low output levels. The increased dissipation results in the temperature of the final PA increasing at higher output power levels. Other solid-state components earlier in the chain are both inherently lower-power devices and are also not typically driven as deep into saturation (i.e., dissipated power and temperature rise may be much more constant with drive level for components earlier in the chain). A result of the increase in temperature is that the temperature, and thus gain, of the power amplifier will vary much more as a function of output power than will the temperature, and thus gain, of the earlier stages in the chain. Thus, the gain of the entire system can vary as a function of output power.

The thermal effects do not occur instantaneously. Heating and cooling often takes several minutes for the temperatures to reach equilibrium. The slow response of the thermal effects means that the results of a measurement of the BUC (i.e., gain) will drift over time, and will also depend on the time taken to perform the measurement. If the gain measurement is very fast (i.e., on the order of a few seconds) the measured saturation curve may appear relatively constant with respect to output power because the unit does not have time to heat up and cool down. If the measurement is very slow and the unit has time to reach thermal equilibrium at every point, the saturation curve may show a much greater dependence on output power. Depending on how the unit is compensated, the gain curve may decrease substantially with output power (i.e., a "soft" saturation curve) or the gain curve may actually increase with output power (i.e., a "gain expansion" curve). The effects can also be seen by tracking the output power as a function of time. For example, the amplifier could be driven from zero to near saturation very suddenly. As the internal temperatures settle and gain compensation is performed, the observed output power may overshoot, undershoot, or even oscillate about the steady-state power before settling at equilibrium.

The thermal effects are difficult to compensate using the simple single-temperature method. The temperature distribution among the many components in the BUC will be different and will also depend on the BUC output power. As the output power increases the temperature of the PA will rise more than the other components in the chain, (i.e., a local effect). When the ambient temperature changes, the temperature of all the components in the BUC will change by roughly the same amount (i.e., a global effect). By only looking at a single internal temperature, conventional BUCs cannot differentiate whether a temperature rise is due to increased drive or increased ambient temperature, and these two causes will have different effects on the BUC gain.

It would be desirable to implement a satellite communications solid-state block upconverter with gain compensation.

SUMMARY

The invention concerns an apparatus including a circuit, a temperature sensor, a sensor circuit and a control system. The circuit may be configured to receive an input signal and a configuration signal and generate an output signal in response to performing an upconversion of the input signal to a selected frequency band and an amplification of the input signal in response to the configuration signal. The temperature sensor may be configured to measure a temperature. The sensor circuit may be configured to measure a sensor value. The control system may be configured to generate the configuration signal in response to the temperature and the sensor value. The configuration signal may be generated to maintain a gain of the amplification at a target level over a range of an operating condition during the upconversion. The target level of the gain over the range of the operating condition may be determined in response to a pre-determined calculation.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
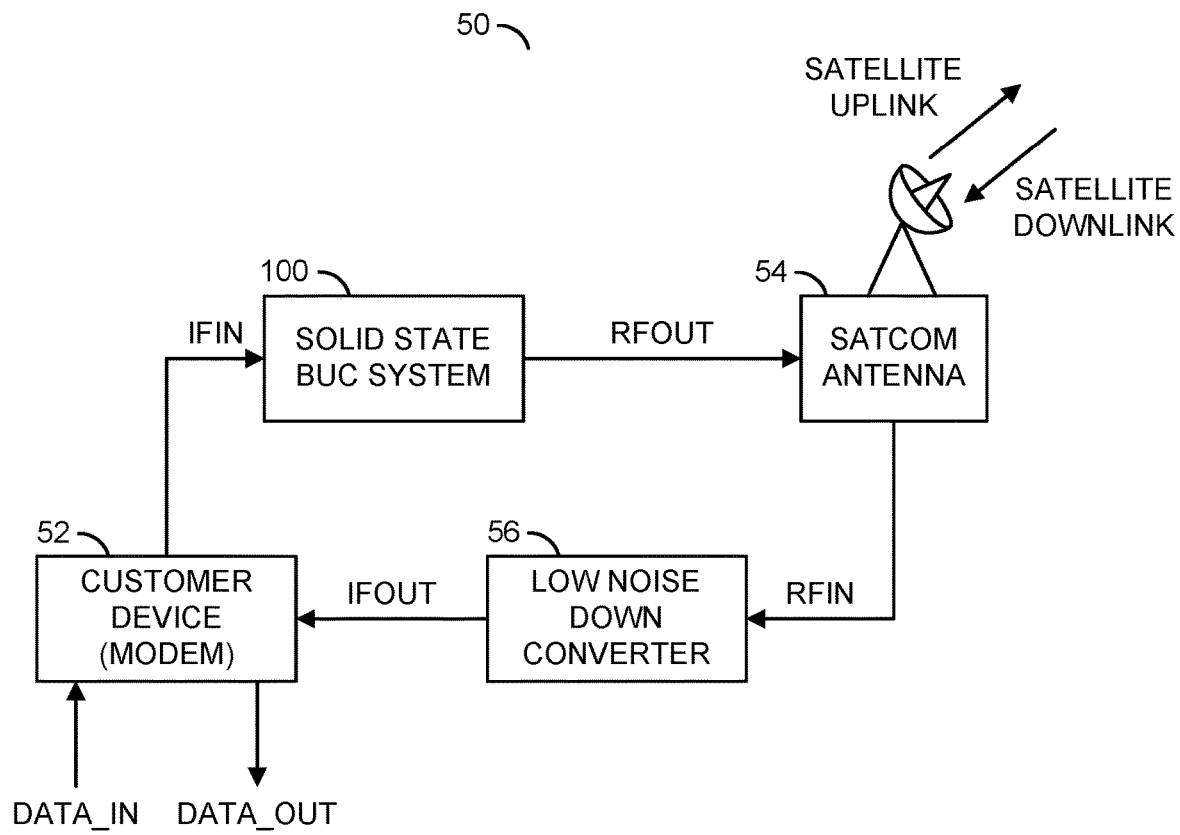
FIG. 1 is a block diagram illustrating a context of an example embodiment of the present invention.

Embodiments of the present invention include providing a satellite communications solid-state block upconverter with gain compensation that may (i) operate over a wide range of temperatures, (ii) keep a gain ratio constant over an operating condition, (iii) measure an internal temperature and at least one other sensor value, (iv) measure an output power, (v) compensate for an age of components, (vi) vary gain in real-time based on a calculation, (vii) vary gain in real-time based on pre-determined values, (viii) measure multiple temperatures at different locations in a device, (ix) operate over a wide range of output power and/or (x) be implemented as one or more integrated circuits.

Embodiments of the present invention may implement a solid-state block upconverter (BUC). In one example, the BUC may be used in satellite communications. The BUC may be configured to operate with similar performance over various operating conditions. In one example, the gain of the BUC may be kept constant over a wide range of temperatures. The performance of the BUC may be kept constant in response to monitoring a temperature within the BUC and one or more other parameters (e.g., sensor values), and adjusting one or more variable gain devices (e.g., amplifiers and/or attenuators) according to the temperature reading and the other sensor values.

Embodiments of the present invention may implement one or more sensors configured to read the sensor values along with the internal temperature. The sensor values may comprise signals measured by various sensors (e.g., temperatures measured at other locations in the BUC, an RF power level detected at various locations in the BUC, an IF power level detected at various locations in the BUC, DC power drawn by various components in the BUC, etc.). Monitor and control circuitry of the BUC may be configured to adjust one or more variable gain devices based on the internal temperature signal and at least one of the other internal signals measured. Adjusting the gain in response to the internal temperature and at least one other sensor value may enable gain compensation over an operating condition that achieves a target level. The consistency of the gain over various operating conditions and/or a range of operating conditions may be held at a constant level with more consistency than performing gain compensation in response to the internal temperature measurement alone. For example, embodiments of the present invention may enable temperature compensation that makes the gain of the BUC more constant (e.g., less variation from a target level) with respect to the temperature of the environment and with respect to a drive level and/or an output level of the unit as well.

In some embodiments, the BUC may implement a high-power solid-state BUC comprising a forward output power detector (e.g., monitoring and control circuitry of the BUC may report the operating power to a user). In an example, gain compensation may be performed by determining how to set the variable gain devices based on the internal temperature measurement and an output power measurement. The monitoring and control circuitry may set control signals to the variable-gain devices based on at least two inputs: the temperature measurement and the output power measurement.

In some embodiments, the BUC may be configured to monitor an internal temperature and the current that a power amplifier is drawing from a prime supply. Generally, the current draw may be an increasing function of output power. Gain compensation may be adjusted across output power and ambient temperature.

In some embodiments, the BUC may be configured to monitor an internal temperature, an input power level and/or an output power level. The gain compensation may be performed using the internal temperature measurement and the input power level, the internal temperature measurement and the output power level or a combination of the internal temperature measurement, the input power level and the output power level. These three variables may enable achieving a very consistent (e.g., constant) gain over a wide range of operating conditions.

In some embodiments, the BUC may be configured to measure the internal temperature at one location and the internal temperature at one or more other locations. Generally, the temperature of power amplifiers may vary greatly with output power, while the temperature of other components that are distant or thermally isolated from the power amplifiers may not. The temperature of the thermally isolated components may be more dependent on the ambient temperature of the unit. For example, the gain compensation may be performed in response to the power amplifier temperature and the temperature of a distant component. The temperature difference between the power amplifiers and other components may be calculated. By taking account of both temperatures, better gain compensation across both output power and ambient temperature may be achieved.

Referring to FIG. 1, a block diagram illustrating a context of an example embodiment of the present invention is shown. A system 50 is shown. The system 50 may implement a satellite communications system.

The system 50 may comprise a block (or circuit) 52, a block (or circuit) 54, a block (or circuit) 56 and/or a block (or circuit) 100. The circuit 52 may implement a customer device. The circuit 54 may implement a satellite antenna. The circuit 56 may implement a downconverter. The circuit (or apparatus) 100 may implement a solid state block upconveter (BUC) system. The system 50 may comprise other components (not shown). The number, type and/or arrangement of the components of the satellite communications system 50 may be varied according to the design criteria of a particular implementation.

The customer device (or appliance) 52 may implement a modem. The modem 52 may be a transmit/receive device. The modem 52 may be located in the property of an end user. The modem 52 may enable an end user to communicate with the satellite communication system 50. The modem 52 may receive a signal (e.g., DATA_IN) and/or a signal (e.g., IFOUT). The modem 52 may generate a signal (e.g., DATA_OUT). The signal DATA_IN may be an input from a user. The signal DATA_OUT may be an output presented to the user. For example, the signal DATA_IN and the signal DATA_OUT may each be a digital stream.

The modem 52 may communicate a signal (e.g., IFIN) to the BUC 100. The signal IFIN may be an interface signal. The signal IFIN may carry a combination of data. The signal IFIN may comprise one or more of an intermediate frequency signal to be converted and/or amplified by the BUC 100 into a radio frequency signal.

The BUC 100 may receive the signal IFIN. The BUC 100 may be configured to generate a signal (e.g., RFOUT). The signal RFOUT may be a radio-frequency signal. The signal RFOUT may be communicated to the satellite antenna system 54.

In one example, the BUC 100 may be configured for use within the satellite communication system 50. The BUC 100 may be configured to transmit uplink signals the satellite antenna 54. The satellite antenna 54 may be configured to transmit the uplink signals from the ground to an orbiting satellite (not shown). The BUC 100 may be configured to upconvert a low-frequency IF signal (e.g., the signal IFIN) to a higher-frequency RF signal (e.g., the signal RFOUT). The BUC 100 may be configured to amplify a low-power IF signal (e.g., the signal IFIN) to a high-power RF signal (e.g., the signal RFOUT). In an example, the signal IFIN may be in a range of 1-2 GHz and have a power level of approximately −10 dBm.

The BUC 100 may be configured to select a frequency band for communication. The signal RFOUT may be generated at various satcom frequency bands. In an example, the signal RFOUT may be generated at X-band (e.g., approximately 8 GHz), Ku-Band (e.g., approximately 14 GHz), or Ka-band (e.g., approximately 30 GHz). The output power level of the signal RFOUT may be in a range from a few Watts to a thousand Watts. The frequency and/or the power level of the signal IFIN and/or the signal RFOUT may be varied according to the design criteria of a particular implementation.

The satellite antenna 54 may be configured to communicate with a satellite (not shown). The satellite antenna 54 may receive the signal RFOUT. The data from the signal RFOUT may be communicated as part of the satellite uplink. The satellite antenna 54 may receive data from the satellite as part of the satellite downlink. The satellite antenna 54 may be configured to generate a signal (e.g., RFIN). The signal RFIN may comprise the data received as part of the satellite downlink.

The downconverter 56 may implement a low-noise downconverter. The downconverter 56 may receive the signal RFIN. The downconverter 56 may generate a signal (e.g., IFOUT). The signal IFOUT may be presented to the modem 52. The downconverter 56 may convert the radio frequency signal RFIN to an intermediate frequency signal that may be read by the modem 52. The modem 52 may generate the signal DATA_OUT in response to the intermediate frequency signal IFOUT.

The BUC 100 may be configured to perform gain compensation to enable a gain response to be at a target level (e.g., substantially constant) over various operating conditions during an upconversion. The signal RFOUT may be generated according to a particular channel assignment (e.g., the selected frequency). The signal RFOUT may be generated partially in response to the gain compensation performed by the BUC 100. The gain may be a ratio of the output power of the signal RFOUT to the input power of the signal IFIN.

The BUC 100 may operate over various operating conditions. One of the operating conditions may be an ambient temperature. A typical ambient temperature range (e.g., for military or commercial operations) may be from −40 C to 60 C. Generally, as temperature changes, the BUC 100 may perform gain compensation to prevent the gain from changing (e.g., maintain the target level). The BUC 100 may be configured to maintain the substantially constant gain over temperatures ranges of −40 C to 60 C and/or temperatures less than −40 C and greater than 60 C. For example, without the gain compensation performed by the BUC 100, there may be a gain decrease of approximately 0.15 dB for every temperature increase of 10 C for each stage of amplification.

Generally, the apparatus 100 may be configured as a converter configured to generate an output signal in response to a conversion of an input signal to a selected frequency band (e.g., an upconverter configured to upconvert an input signal to a selected frequency, a downconverter configured to downconvert an input signal to a selected frequency, etc.). In the example embodiment shown, the apparatus 100 may implement the BUC configured to maintain the substantially constant gain and/or power output over the range of one or more of the operating conditions. In some embodiments, the apparatus 100 may be implemented as the low-noise downconverter 56. The low-noise downconverter 56 may be configured to maintain the substantially constant gain and/or output power over the range of one or more of the operating conditions. In an example, the low-noise downconverter 56 may receive the input signal RFIN from the satellite antenna 54 and downconvert the signal RFIN to the intermediate frequency signal IFOUT. For example, the signal RFIN may comprise a radio frequency signal communicated from the satellite antenna 54, and the low-noise downconverter 56 may generate the signal IFOUT comprising an intermediate frequency signal to be received by the modem 62. The low-noise downconverter 56 may be configured to downconvert a high-frequency RF signal (e.g., the signal RFIN) to a low-frequency IF signal (e.g., the signal IFOUT). The low-noise downconverter 56 may be configured to amplify and/or attenuate the high-power RF signal (e.g., the signal RFIN) to a low-power IF signal (e.g., the signal IFOUT). In an example, the signal IFOUT may be in a range of 1-2 GHz and have a power level of approximately −10 dBm. The signal IFOUT may be generated partially in response to the gain compensation performed by the low-noise downconverter 56. The gain may be a ratio of the output power of the signal IFOUT to the input power of the signal RFIN. Generally, specific examples may be described in association with the upconversion performed by the BUC 100. However, similar operations and/or functionality may be implemented by the low-noise downconverter 56. In some embodiments, both the BUC 100 and the low-noise downconverter 56 may be configured to maintain the substantially constant gain and/or power output over the range of one or more of the operating conditions.

Figure 2:
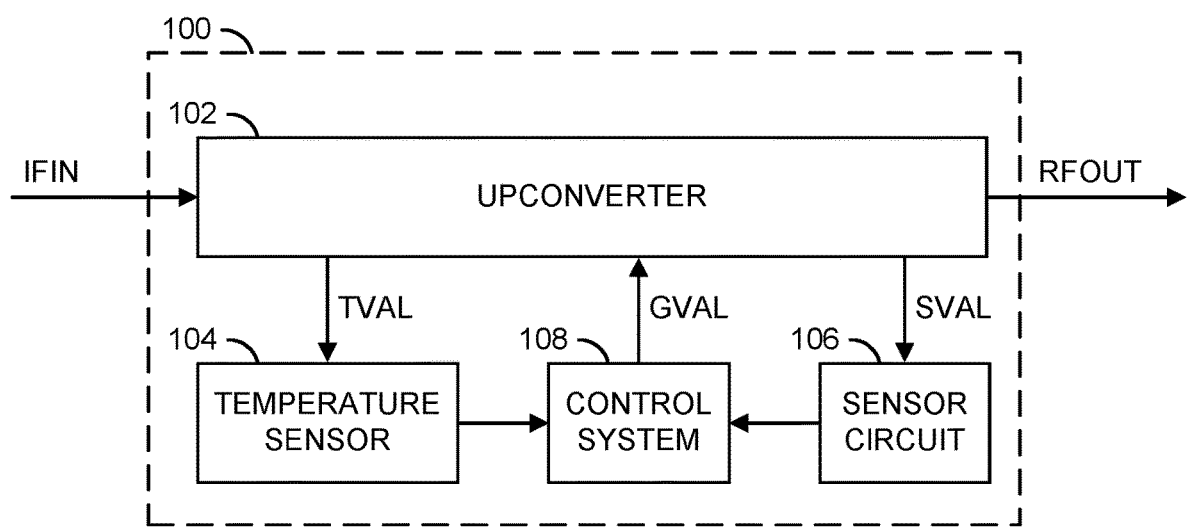
FIG. 2 is a block diagram illustrating an example embodiment of the present invention.

Referring to FIG. 2, a block diagram illustrating an example embodiment of the present invention is shown. A block diagram of the BUC 100 is shown. The BUC 100 is shown receiving the signal IFIN and generating the signal RFOUT in response to the signal IFIN. The overall gain that may be maintained at a constant level over various operating conditions may be a ratio of the output power level measured at the output signal RFOUT to the input power level measured at the input signal IFIN.

The BUC 100 is shown comprising a block (or circuit) 102, a block (or circuit) 104, a block (or circuit) 106 and/or a block (or circuit) 108. The circuit 102 may implement an upconverter. The circuit 104 may implement a temperature sensor. The circuit 106 may implement a sensor circuit. The circuit 108 may implement a control system. The BUC 100 may comprise other components (not shown). The number, type and/or arrangement of the components of the BUC 100 may be varied according to the design criteria of a particular implementation.

The upconverter 102 may implement a radio-frequency (RF) chain. The upconverter 102 may comprise one or more components that may be described in more detail in association with FIG. 3. The upconverter 102 may receive the input signal IFIN and a signal (e.g., GVAL). The signal GVAL may be a control signal configured to adjust a gain value. The upconverter 102 may be configured to generate the output signal RFOUT in response the input signal IFIN and the gain compensation value GVAL.

The upconverter 102 may be configured to perform an upconversion to a selected frequency band. The selected frequency band may be a frequency used for communication by the satellite antenna 54. The selected frequency may be the X-band frequency, the Ku-Band frequency and/or the Ka-band frequency. The upconverter 102 may be configured to perform an amplification in response to the gain compensation value GVAL. In an example, a power level of the input signal IFIN may be approximately −10 dBm. In one example, for a selected frequency in the Ka-band frequency (e.g., 30 GHz) with over 200 W of saturated output power the BUC 100 may have a rated linear output power of the signal RFOUT of 125 W (51 dBm). The frequency band selected and/or the amount of amplification performed may be varied according to the design criteria of a particular implementation.

The temperature sensor 104 may be configured to measure a temperature value. The temperature sensor 104 is shown receiving a signal (e.g., TVAL). The signal TVAL may be a temperature measurement of the RF chain 102. The signal TVAL may be a temperature measurement at one of various locations (e.g., one of the components) in the RF chain 102. In one example, the signal TVAL may comprise a temperature measurement of a final power amplifier in the RF chain 102. The signal TVAL may be measured by the temperature sensor 104 and presented to the control system 108. The component that may be measured by the temperature sensor 104 may be varied according to the design criteria of a particular implementation.

The sensor circuit 106 may be configured to measure a sensor value. The sensor circuit 106 is shown receiving a signal (e.g., SVAL). The signal SVAL may be a sensor value measured by the sensor circuit 106. The signal SVAL may be measured at one of various locations (e.g., measured at one of the components) in the RF chain 102. The signal SVAL may be measured by the sensor circuit 106 and presented to the control system 108. In the example shown, one implementation of the sensor circuit 106 is shown. In some embodiments, the sensor circuit 106 may comprise a sensor unit comprising multiple sensors capable of performing various measurements (e.g., generating multiple, distinct sensor values). In some embodiments, the BUC 100 may implement multiple implementations of the sensor circuit 106, each capable of measuring a sensor value. The number and/or type of sensor circuits 106 implemented may be varied according to the design criteria of a particular implementation.

In some embodiments, the sensor circuit 106 may comprise a power detector. The sensor circuit 106 implemented as a power detector may measure a power level at a location in the RF chain 102. In one example, the sensor circuit 106 may measure an input power level of the input signal IFIN as the sensor value SVAL. In another example, the sensor circuit 106 may measure an output power level of the output signal RFOUT as the sensor value SVAL. In yet another example, the sensor circuit 106 may measure an internal (or intermediate) power level of the RF chain 102 as the sensor value SVAL. For example, the sensor circuit 106 may perform a power measurement at one or more of the components in the RF chain 102.

In some embodiments, the sensor circuit 106 may comprise a voltage monitor. The sensor circuit 106 implemented as a voltage monitor may measure a voltage at a location in the RF chain 102. The voltage measured may be the sensor value SVAL. The voltage may be measured at one or more of the components in the RF chain 102.

In some embodiments, the sensor circuit 106 may comprise a current monitor. The sensor circuit 106 implemented as a current monitor may measure a current at a location in the RF chain 102. The current measured may be the sensor value SVAL. The current may be measured at one or more of the components in the RF chain 102.

In some embodiments, the sensor circuit 106 may comprise a temperature sensor. The sensor circuit 106 implemented as a temperature monitor may measure a temperature at a location in the RF chain 102 at a different location than the temperature sensor 104. The temperature measured may be the sensor value SVAL that may provide the temperature at a location distinct from the temperature value TVAL measured by the temperature sensor 104. In one example, the temperature sensor 104 may measure the temperature value TVAL at the power amplifier of the RF chain 102 and the sensor circuit 106 may measure the temperature as the sensor value SVAL at different component in the RF chain 102 (e.g., a temperature at the input of the RF chain 102, a component of the RF chain 102 that may be thermally isolated from the component measured by the temperature sensor 104, etc.). The combinations of locations for the temperature measurements performed by the temperature sensor 104 and the sensor circuit 106 may be varied according to the design criteria of a particular implementation.

In some embodiments, the sensor circuit 106 may read multiple sensor values (e.g., SVAL_A-SVAL_N, not shown). The multiple sensor values may comprise various combinations of types of measurements. In one example, the sensor values SVAL_A-SVAL_N may comprise the output power level, the voltage measurement and the current measurement. In another example, the sensor values SVAL_A-SVAL_N may comprise the input power level, and two additional temperature measurements. In yet another example, the sensor values SVAL_A-SVAL_N may comprise the input power level, the output power level, the voltage measurement, the current measurement and a temperature measurement.

The control system 108 may be configured to adjust the gain compensation value GVAL in response the temperature value TVAL and the sensor value SVAL. In some embodiments, the control system 108 may generate multiple gain compensation values (e.g., GVAL_A-GVAL_M, not shown). The multiple gain compensation values may enable control of multiple different variable gain devices implemented in the upconverter 102. The number of gain compensation values implemented may be varied according to the design criteria of a particular implementation.

The control system 108 may adjust the gain compensation value GVAL in order to maintain an overall gain of the amplification at a constant level (or at a target level that may be substantially constant) with respect to one or more operating conditions of the BUC 100 during the upconversion. The control system 108 may perform a pre-determined calculation based on the temperature value TVAL and the sensor values SVAL_A-SVAL_N (or a single sensor value SVAL) to maintain the constant level of the gain with respect to the operating condition.

Figure 4:
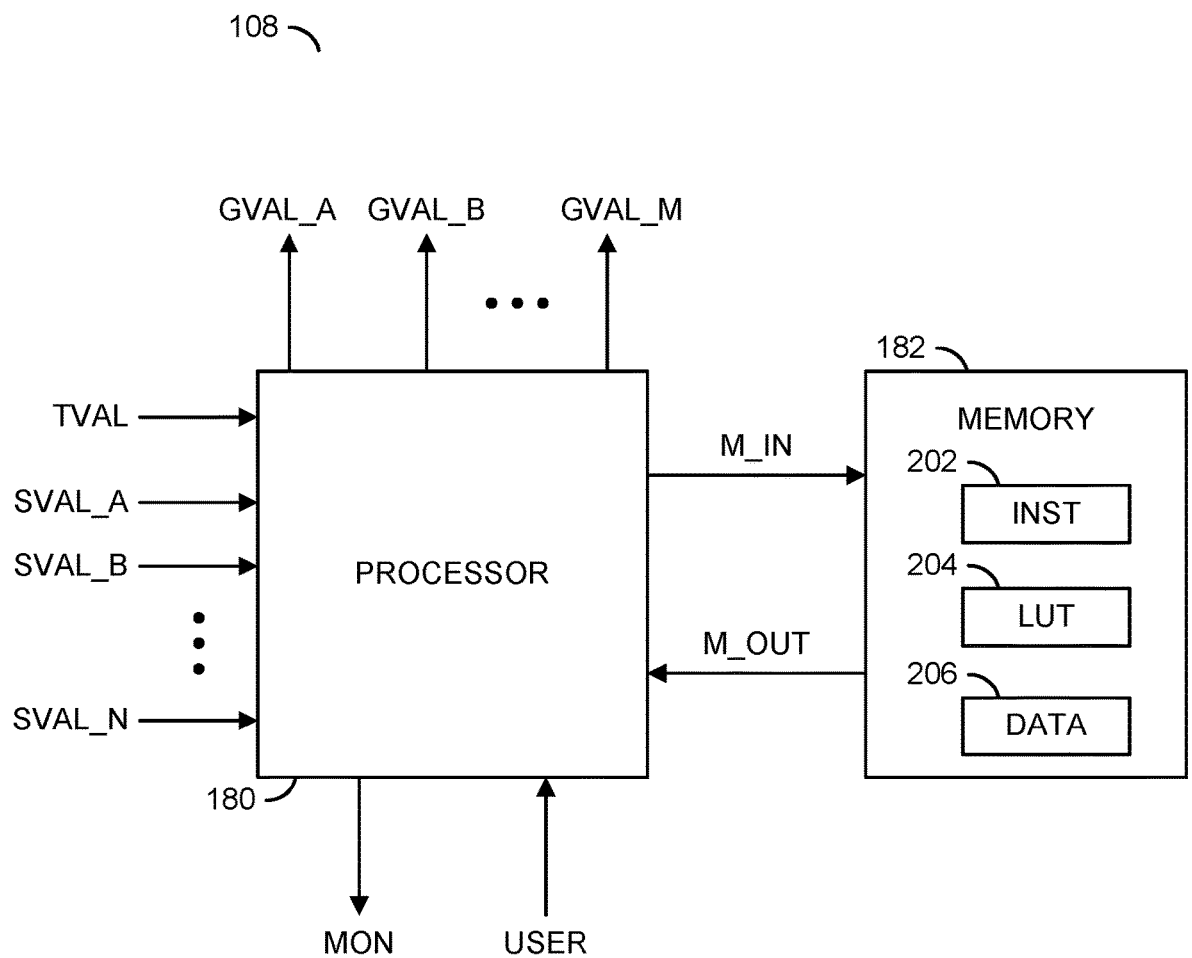
FIG. 4 is a block diagram illustrating a processor and a memory of a control system for adjusting a gain configuration value.

The details of the pre-determined calculation performed by the control system 108 may be described in more detail in association with FIG. 4. The number of sensor values measured may enable a finer grain of responsiveness to changes in the operating conditions of the BUC 100 in order to maintain the constant gain value. Increasing the number of sensor values measured may have a trade-off of increased complexity of the control system 108. The control system 108 may provide an improved amount of control of the gain value compared to measuring the temperature value TVAL alone. The control system 108 may perform the compensation to maintain the gain value at a substantially constant level by measuring a temperature internal to the BUC 100 and at least one other parameter.

The control system 108 may perform the pre-determined calculation based on one or more operating conditions. The performance of the BUC 100 may vary based on the operating conditions. The gain compensation performed by the control system 108 may adjust the gain value to maintain the constant overall gain despite the changes to the operating conditions. The signal GVAL may be presented to one or more of various locations (e.g., gain compensation elements) in the RF chain 102. The signal(s) GVAL_A-GVAL_M may be calculated by the control system 108 and presented to various gain control elements in the RF chain 102. In the example shown, one implementation of the signal GVAL is shown. In some embodiments, the gain compensation may comprise multiple compensation signals capable of performing adjustments to multiple gain control elements at various locations in the RF chain 102 (e.g., generating multiple, distinct compensation values). In some embodiments, the BUC 100 may implement multiple implementations of gain control elements, each capable of independently adjusting the gain. Details of the gain control elements may be described in association with FIG. 5.

In one example, the operating condition may be an ambient temperature of the BUC 100 (e.g., compensate for the approximate gain decrease of 0.15 dB for every temperature increase of 10 C per amplification stage). In another example, the operating condition may be a power level of the output signal (e.g., output power level may be a leading indication of an increase in temperature of the BUC 100). In yet another example, the operating condition may be a power level of the input signal. In still another example, the operating condition may be the age of the components of the BUC 100. For example, the capabilities and/or tolerances of the components of the RF chain 102 may vary the longer the components are in operation. In another example, the operating condition may be a loss of power to an amplifier of the upconverter 102. For example, if an amplifier is powered on or off (or muted/unmuted) suddenly (e.g., a power outage) the BUC 100 may be configured to keep the gain at a level that the gain was at before the loss of power. In yet another example, the operating condition may comprise an amount of time after a change in output power of the signal RFOUT that may be caused by a sudden increase in power of the input signal IFIN (e.g., a transient response).

The operating condition may comprise a combination of various operating conditions. For example, the operating condition may be a combination of the ambient temperature, a power level of the output signal and an age of components. The type of operating condition and/or the amount of compensation to the gain compensation value GVAL selected by the control system 108 in response to each operating condition may be varied according to the design criteria of a particular implementation.

Generally, the apparatus 100 may be configured to implement a converter (e.g., the upconverter 102, a downconverter, etc.). In some embodiments, the apparatus 100 implemented as the low-noise downconverter 56 may comprise similar components as the components shown in association with FIG. 2 (with various modifications for downconversion instead of upconversion). In an example, the low-noise downconverter may implement a downconverter instead of the upconverter 102. The downconverter may receive the signal RFIN and output the signal IFOUT. The downconverter may present a signal TVAL to the temperature sensor 104 and the signal SVAL to the sensor circuit 106. The control system 108 may present the signal GVAL to the downconverter. In an example, for the low-noise downconverter 56, the control system 108 may adjust the gain compensation value GVAL in order to maintain an overall gain of the amplification (or attenuation) at a constant level (or at a target level that may be substantially constant) with respect to one or more operating conditions of the low-noise downconverter 56 during the downconversion.

Figure 3:
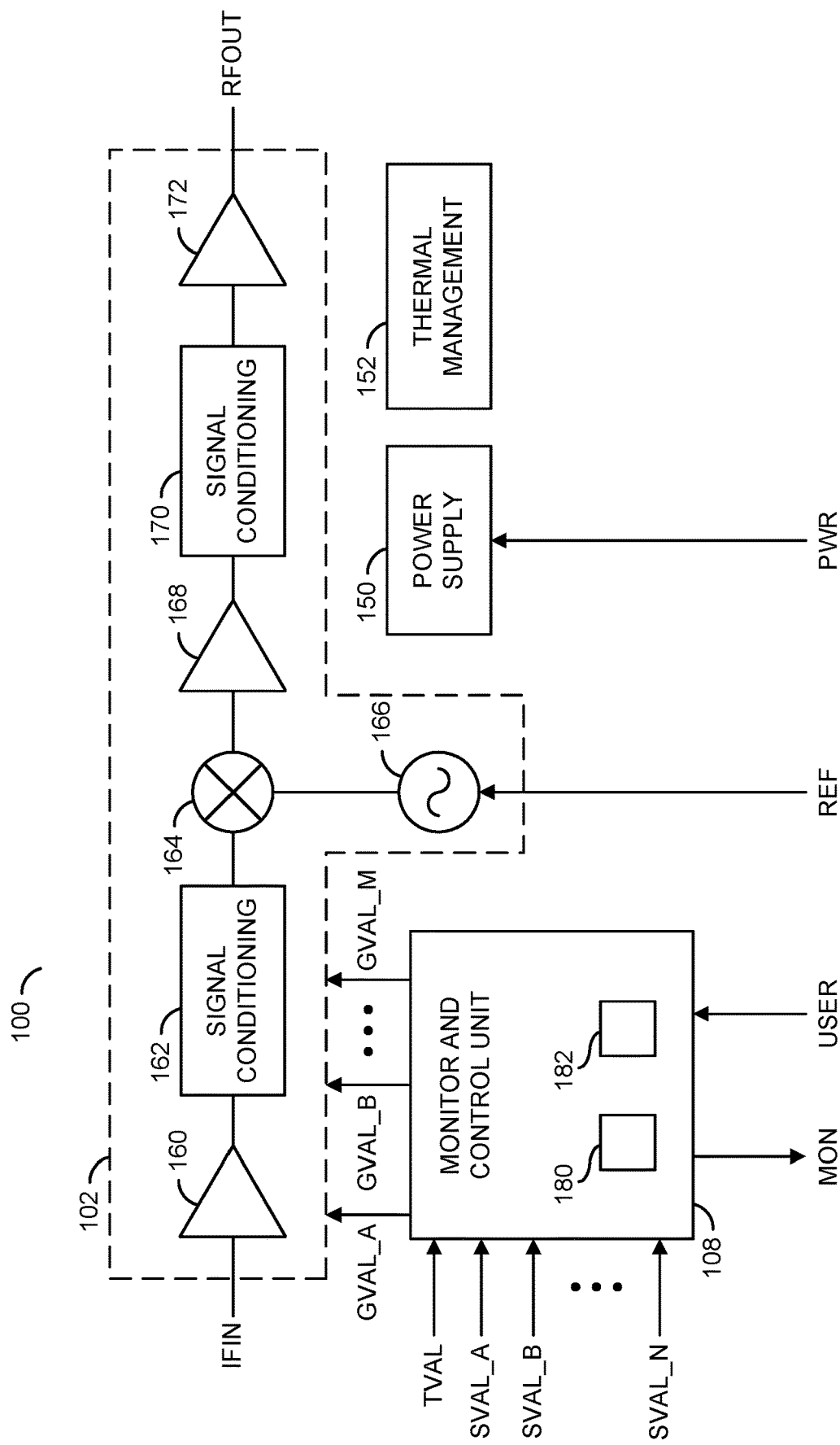
FIG. 3 is a block diagram illustrating components of a satcom BUC.

Referring to FIG. 3, a block diagram illustrating components of a satcom BUC is shown. Components of the BUC 100 are shown. The upconverter 102 and the control system 108 are shown. For clarity, the temperature sensor 104 and the sensor circuit 106 are not shown. The upconverter 102 may receive the input signal IFIN and present the output signal RFOUT.

The BUC 100 is shown further comprising a block (or circuit) 150 and/or a block (or circuit) 152. The circuit 150 may comprise a power supply. The block 152 may comprise thermal management components. The BUC 100 may comprise other components (not shown). The number, type and/or arrangement of the components of the BUC 100 may be varied according to the design criteria of a particular implementation.

The power supply 150 may be configured as a power source for the components of the BUC 100 and/or the various components of the BUC 100. The power supply 150 may receive, convert and/or regulate power received from an external source. The power supply 150 is shown receiving an input signal (e.g., PWR). The signal PWR may be an AC or DC power input. For example, the power supply 150 may convert the input AC or DC power to the voltage levels used to operate the various components of the BUC 100.

The thermal management 152 may be configured to control an operating temperature of the BUC 100. Generally, the thermal management 152 may be configured to remove heat generated by the various components of the BUC 100. In one example, the control system 108 may generate heat in response to performing computations to adjust the gain compensation values GVAL_A-GVAL_M and the thermal management 152 may remove the waste heat generated. Similarly, the thermal management 152 may remove waste heat generated by the components in the RF chain 102. The thermal management 152 may comprise fans, heatsinks, thermal compounds, thermal conductivity pads, etc. In some embodiments, the control system 108 may be configured to generate control signals that adjust a speed of fans implemented by the thermal management 152 (e.g., to provide a balance between sound generated by the fans and the amount of heat dissipated). The types of components used by the thermal management 152 to dissipate heat may be varied according to the design criteria of a particular implementation.

The upconverter 102 may comprise a block (or circuit) 160, a block (or circuit) 162, a block (or circuit) 164, a block (or circuit) 166, a block (or circuit) 168, a block (or circuit) 170 and/or a block (or circuit) 172. The circuit 160 may implement an amplifier. The circuit 162 may implement signal conditioning circuitry. The circuit 164 may implement a mixer. The circuit 166 may implement an oscillator. The circuit 168 may implement an amplifier. The circuit 170 may implement signal conditioning circuitry. The circuit 172 may implement an amplifier. The upconverter 102 may comprise other components (not shown). The number, type and/or arrangement of the components of the upconverter 102 may be varied according to the design criteria of a particular implementation.

The amplifier 160 may implement an intermediate frequency signal amplifier. The amplifier 160 may be configured to receive the input signal IFIN. The amplifier 160 may perform an input amplification to the signal IFIN. The amplified version of the signal IFIN may be presented to the signal conditioning circuitry 162.

The signal conditioning circuitry 162 may implement an intermediate frequency signal conditioning circuit(s). The signal conditioning circuitry 162 may comprise one or more components (e.g., filters, equalizers, variable gain devices, linearizers, etc.). The signal conditioning circuitry 162 may comprise one or more variable gain devices. The variable gain devices of the signal conditioning circuitry 162 may be controlled in response to one of the signals GVAL_A-GVAL_M. For example, the compensation of the gain performed by the control system 108 may be implemented by adjusting the variable gain devices implemented by the signal conditioning circuitry 162. The signal conditioning circuitry 162 may be configured to present the amplified and conditioned intermediate frequency signal to the mixer 164.

The mixer 164 may be configured to upconvert the frequency of the intermediate frequency signal. The mixer 164 may be configured to convert the amplified and conditioned version of the input signal IFIN to a radio frequency signal. The radio frequency signal may be presented to the amplifier 168. The upconversion performed by the mixer 164 may be selected in response to the oscillator 166.

The oscillator 166 may implement a local oscillator. The local oscillator 166 may be locked to an external reference standard. The local oscillator 166 is shown receiving a signal (e.g., REF). The signal REF may comprise the external reference standard. The local oscillator 166 may implement a high-purity local oscillator. In an example, the high-purity local oscillator 166 may be a dielectric resonator oscillator (DRO). The local oscillator 166 may be synchronized to the external standard reference signal REF.

The mixer 164 may be configured to receive the frequency based on the intermediate frequency of the amplified and conditioned version of the input signal IFIN and the frequency generated from the local oscillator 166. The mixer 164 may generate an output radio-frequency signal from one input with the intermediate frequency signal IFIN and one input with a local frequency standard signal derived from the signal REF.

The amplifier 168 may implement a radio-frequency amplifier. The amplifier 168 may be configured to receive the converted radio frequency signal. The amplifier 160 may perform an output amplification to the converted RF signal. The amplified version of the RF signal may be presented to the signal conditioning circuitry 170.

The signal conditioning circuitry 170 may implement a radio-frequency signal conditioning circuit(s). The signal conditioning circuitry 170 may comprise one or more components (e.g., filters, equalizers, variable gain devices, linearizers, etc.). The signal conditioning circuitry 170 may comprise one or more variable gain devices. The variable gain devices of the signal conditioning circuitry 170 may be controlled in response to one of the signals GVAL_A-GVAL_M. For example, the compensation of the gain performed by the control system 108 may be implemented by adjusting the variable gain devices implemented by the signal conditioning circuitry 170. The signal conditioning circuitry 170 may be configured to present the amplified and conditioned radio-frequency signal to the amplifier 172.

The amplifier 172 may implement a power amplifier. The power amplifier 172 may be configured to receive the amplified and conditioned radio-frequency signal. The power amplifier 172 may be configured to provide a final amplification to the required output power level for communication to the satellite antenna 54. The power amplifier 172 may generate the output signal RFOUT. The final power amplifier 172 may be the most powerful amplifier (e.g., compared to the IF amplifier 160 and the RF amplifier 168) in the BUC 100. The final power amplifier 172 may draw and dissipate the most power out of the components of the BUC 100.

The control system 108 may implement a monitor and control unit. The control system 108 may be configured to control the operation of all of the components of the BUC 100. The control system 108 is shown receiving the temperature measurement signal TVAL and the sensor values SVAL_A-SVAL_N. The control system 108 is shown generating the configuration signals GVAL_A-GVAL_M. The control system 108 may comprise a monitor configured to read the temperature value TVAL and the sensor value(s) SVAL_A-SVAL_N. The control system 108 may receive a signal (e.g., USER). The control system 108 may generate a signal (e.g., MON). The signal MON may be provided to a user interface to enable a user to monitor various characteristics of the BUC 100 (e.g., power level, fault status, temperature, power consumption, etc.). The signal USER may be received from the user interface to enable a user to manually control various components (e.g., enable/disable communication, mute/unmute communication, adjust the frequency of the local oscillator 166, adjust an attenuator level, etc.). The location of the signal TVAL, the signals SVAL_A-SVAL_N, the signals GVAL_A-GVAL_M, the signal USER and/or the signal MON are shown at arbitrary locations for illustrative purposes. The location, order and/or arrangement of the signals presented to and/or received by the control system 108 may be varied according to the design criteria of a particular implementation.

The control system 108 may comprise a block (or circuit) 180 and/or a block (or circuit) 182. The circuit 180 may implement a processor. The circuit 182 may implement a memory. Details of the processor 180 and the memory 182 may be described in more detail in association with FIG. 4.

The control system 108 may comprise other components (not shown). The number, type and/or arrangement of the components of the control system 108 may be varied according to the design criteria of a particular implementation.

The control system 108 may be configured to compensate for the changing gain caused by changes in operating conditions. The control system 108 may maintain the overall gain by adjusting one or more variable gain components in the RF chain 102 using one or more of the gain compensation values GVAL_A-GVAL_M. The gain compensation values GVAL_A-GVAL_M may be generated in response to the temperature measurement TVAL measured at some point in the BUC 100 and one or more of the sensor values SVAL_A-SVAL_N. The variable gain components may be in the IF path (e.g., the components 160-162) and/or the RF path (e.g., the components 168-170) of the upconverter 102. In one example, the variable gain components may comprise a variable gain amplifier and/or a variable attenuator.

The temperature value TVAL and/or temperatures measured as one of the sensor values SVAL_A-SVAL_N may be measured by an internal thermocouple, an external thermocouple, a thermal resistor, an infrared (IR) sensor and/or another type of electronic temperature measuring device. Generally, the thermal effects caused by changes in the operating conditions may not occur instantaneously. The power dissipated may be considerable and the large metal heat sinks and forced air implemented by the thermal management 152 may cool the BUC 100. For example, the components of the thermal management 152 (e.g., large metal structures) may be heated and cooled gradually, often taking several minutes for the temperatures to reach equilibrium. The control system 108 may make adjustments to the variable gain components depending on the measured temperature based on calculations performed using computer readable instructions and/or a lookup table implemented by the processor 180 and/or the memory 182.

Referring to FIG. 4, a block diagram illustrating a processor and a memory of a control system for adjusting a gain configuration value is shown. The processor 180 and the memory 182 of the control system 108 are shown. In the example shown, the processor 180 and the memory 182 may be implemented as separate components. In some embodiments, the memory 182 may be embedded in the processor 180. The processor 180 is shown receiving the temperature measurement signal TVAL, the sensor value signals SVAL_A-SVAL_N and/or the user input signal USER. The processor 180 is shown generating the monitoring signal MON and the gain configuration value signals GVAL_A-GVAL_M.

The processor 180 may be configured to interface and communicate with the memory 182. The processor 180 may communicate a signal (e.g., M_IN) to the memory 182. The processor 182 may receive a signal (e.g., M_OUT) from the memory 182. The signal M_IN may present data generated by the processor 180 to the memory 182. For example, the temperature value TVAL and/or the sensor values SVAL_A-SVAL_N may be presented to the memory 182 for storage. The signal M_OUT may present data stored by the memory 182 to the processor 180. The number and/or format of the communication between the processor 180 and/or the memory 182 may be varied according to the design criteria of a particular implementation.

The processor 180 may implement a microprocessor (e.g., ARM, RISC-V, PIC16, etc.). The memory 182 may implement flash memory, registers and/or cache memory. In some embodiments, the processor 180 and the memory 182 may be implemented as part of a system-on-chip (SoC). The implementation of the processor 180 and/or the memory 182 may be varied according to the design criteria of a particular implementation.

The memory 182 may comprise a block (or module) 202, a block (or module) 204 and/or a block (or module) 206. The block 202 may comprise computer readable instructions. The block 204 may implement a lookup table (LUT). The block 206 may comprise various data storage. The memory 182 may comprise other types of data storage (not shown). While the various modules 202-206 are shown as distinct blocks, the arrangement of the storage of the modules 202-206 may be distributed throughout the memory 182. The type of data and/or the arrangement of the data stored in the memory 182 may be varied according to the design criteria of a particular implementation.

The computer readable instructions 202 may be executed by the processor 180. For example, the signal M_OUT may present the computer readable instructions 202 to the processor 180. The processor 180 may execute the computer readable instructions to perform various calculations, adjust outputs and/or read inputs. In an example, the computer readable instructions 202 may be executed to adjust the cooling of the thermal management components 152. In another example, the computer readable instructions 202 may be configured to generate one or more of the signals GVAL_A-GVAL_M to adjust the gain control elements. In yet another example, the computer readable instructions 202 may be configured to enable the processor 180 to read, compare and/or evaluate the temperature measurement signal TVAL and the sensor value signals SVAL_A-SVAL_N.

In some embodiments, the computer readable instructions 202 may comprise a pre-determined calculation. In one example, the pre-determined calculation may comprise a mathematical formula with at least two independent variables (e.g., one for the temperature measurement TVAL and at least one of the sensor values SVAL_A-SVAL_N). The pre-determined calculation may comprise various weighting values, coefficient values and/or variables that may be executed in response to the values read from the temperature measurement value TVAL and/or the sensor values SVAL_A-SVAL_N. The pre-determined calculation may be stored in the computer readable instructions 202 to enable the processor 180 to calculate the gain compensation values GVAL_A-GVAL_M in real-time in response to the measured temperature value TVAL and/or the sensor values SVAL_A-SVAL_N.

The lookup table 204 may comprise storage of pre-determined values that may be selected for the gain compensation values GVAL_A-GVAL_M in response to the real-time measurement of the temperature measurement TVAL and at least one of the sensor values SVAL_A-SVAL_N. In one example, the lookup table 204 may comprise a two-dimensional lookup matrix. The lookup table 204 may provide pre-calculated values for the pre-determined calculation (e.g., to avoid the processor 180 calculating the gain compensation values GVAL_A-GVAL_M for each measurement performed). For example, the processor 180 may provide the temperature measurement TVAL and one or more of the sensor values SVAL_A-SVAL_N to the memory 182 as the memory input signal M_IN and the lookup table 204 may provide the gain compensation value for the particular values. The gain compensation value from the lookup table 204 may be presented to the processor 180 as the memory output signal M_OUT. The processor 180 may communicate the gain compensation values GVAL_A-GVAL_M to the gain compensation components.

The data 206 may provide miscellaneous storage for the control system 108. In one example, the data 206 may store the prior values for the temperature measurement TVAL and/or the sensor values SVAL_A-SVAL_N along with a timestamp, the operating conditions of the BUC 100 and/or the overall gain. The data 206 may be used to refine the pre-determined calculation (e.g., the computer readable instructions 202 and/or the values stored in the lookup table 204). In some embodiments, the data 206 may store information corresponding to the age of the components of the BUC 100 (e.g., information about the operating conditions).

The pre-determined calculation may generate the gain compensation values GVAL_A-GVAL_M that maintain a constant overall gain over various operating conditions (e.g., output power, ambient temperature, age, etc.). The more sensor values SVAL_A-SVAL_N used to determine the gain compensation values GVAL_A-GVAL_M, the greater the complexity of the pre-determined calculation. For example, additional independent variables representing the multiple sensor values SVAL_A-SVAL_N for the pre-determined calculation using the computer readable instructions 202 may use more computations (e.g., take longer to perform and/or consume more power to perform) than using the temperature value TVAL alone. In another example, multiple sensor values SVAL_A-SVAL_N may increase the size of the lookup table 204 compared to using the temperature value TVAL alone. In yet another example, multiple sensor values SVAL_A-SVAL_N may increase difficultly and/or an amount of time for calibration during a factory temperature compensation process. In some embodiments, the performance of the BUC 100 may be consistent enough between individual devices to enable the pre-determined calculation to be hard coded into control system 108 after measurements are performed using prototype data (e.g., the prior values stored in the data 206). Subsequent units may only need a slight fine tuning to achieve acceptable performance.

Figure 5:
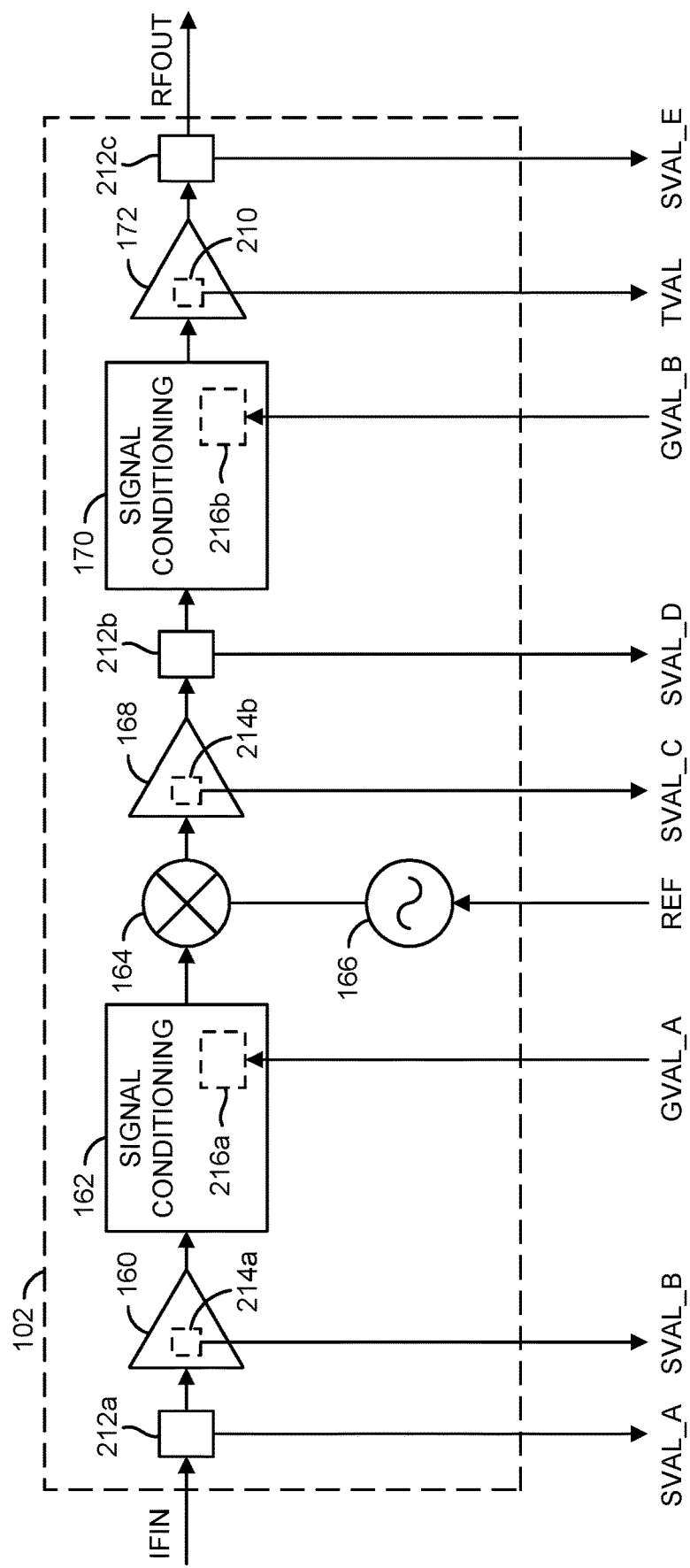
FIG. 5 is a block diagram illustrating a temperature circuit, sensor circuits and variable gain devices of a satcom BUC.

Referring to FIG. 5, a block diagram illustrating a temperature circuit, sensor circuits and variable gain devices of a satcom BUC is shown. The RF chain 102 is shown. The intermediate frequency signal amplifier 160, the intermediate signal conditioning circuitry 162, the mixer 164, the local oscillator 166, the radio-frequency amplifier 168, the radio-frequency signal conditioning circuitry 170 and the power amplifier 172 are shown. The RF chain 102 may receive the input signal IFIN and the external reference signal REF and generate the output signal RFOUT. The RF chain 102 is also shown receiving the gain compensation values GVAL_A-GVAL_B and presenting the temperature value TVAL and the sensor values SVAL_A-SVAL_E. The gain compensation values GVAL_A-GVAL_B and the sensor values SVAL_A-SVAL_E are shown as an illustrative example of the gain compensation values GVAL_A-GVAL_M and the sensor values SVAL_A-SVAL_N that may be implemented by the BUC 100. Other amounts and/or arrangements of the gain compensation value signals GVAL_A-GVAL_M and/or the sensor values SVAL_A-SVAL_N may be implemented.

A block (or circuit) 210, blocks (or circuits) 212a-212c, blocks (or circuits) 214a-214b and/or blocks (or circuits) 216a-216b are shown in the BUC 100. The circuit 210 may implement a temperature sensor. The circuits 212a-212c may implement sensor circuits. The circuits 214a-214b may implement sensor circuits. The circuits 216a-216b may implement gain control elements. Other circuits may be implemented in the BUC 100 (not shown). The number, type and/or arrangement of the temperature sensor 210, the sensor circuits 212a-212c, the sensor circuits 214a-214b and/or the gain control elements 216a-216b may be varied according to the design criteria of a particular implementation.

The temperature sensor 210 may be configured to measure an internal temperature of one of the components of the BUC 100. In the example shown, the temperature sensor 210 may measure the temperature of the power amplifier 172. In one example, the temperature sensor 210 may be implemented by any of the components 160-172. In another example, the temperature sensor 210 may be implemented at a location internal to the BUC 100, but not co-located with any of the components 160-172 shown. In an example, the temperature sensor 210 may be located to measure the temperature at a metal housing of the BUC 100. In yet another example, the temperature sensor 210 may be located to measure the temperature at a heatsink. The temperature sensor 210 may generate the signal TVAL. The signal TVAL may be presented to the control system 108. In some embodiments, the component measured to generate the signal TVAL may be thermally isolated from other components used for a temperature measurement for one of the sensor values SVAL_A-SVAL_N.

The sensor circuit 212a is shown at an input of the intermediate power amplifier 160. The sensor circuit 212a may be configured to perform a power measurement. In the example shown, the sensor circuit 212a may measure a power level of the input signal IFIN (e.g., an input power level). The sensor circuit 212a may generate the signal SVAL_A. In the example shown, the signal SVAL_A may be an input power. The signal SVAL_A may be presented to the control system 108.

The sensor circuit 212b is shown at an output of the radio-frequency power amplifier 168. In one example, the sensor circuit 212b may measure a power level internal to the BUC 100 (e.g., an intermediate power level). In another example, the sensor circuit 212b may measure a current within the BUC 100. In yet another example, the sensor circuit 212c may measure a voltage within the BUC 100. The sensor circuit 212b may generate the signal SVAL D. The signal SVAL D may be presented to the control system 108.

The sensor circuit 212c is shown at an output of the power amplifier 172. The sensor circuit 212c may be configured to perform a power measurement. In the example shown, the sensor circuit 212c may measure a power level of the output signal RFOUT (e.g., an output power level). The sensor circuit 212c may generate the signal SVAL_E. In the example shown, the signal SVAL_E may be an output power. The signal SVAL_E may be presented to the control system 108.

The sensor circuit 214a is shown implemented with the intermediate power amplifier 160. The sensor circuit 214a may be configured to perform a temperature measurement. In the example shown, the sensor circuit 214a may measure an internal temperature of the intermediate power amplifier 160. The sensor circuit 214a may generate the signal SVAL_B. In the example shown, the signal SVAL_B may be a temperature measurement. The signal SVAL_B may be presented to the control system 108.

The sensor circuit 214b is shown implemented with the radio-frequency amplifier 168. The sensor circuit 214b may be configured to perform a temperature measurement. In the example shown, the sensor circuit 214b may measure an internal temperature of the radio-frequency power amplifier 168. The sensor circuit 214b may generate the signal SVAL_C. In the example shown, the signal SVAL_C may be a temperature measurement. The signal SVAL_C may be presented to the control system 108.

The gain control element 216a is shown implemented as a component of the signal conditioning circuitry 162. The gain control element 216a may be one component of the BUC 100 that may be configured to adjust the gain in order to maintain a target gain value over a range of an operating condition. The gain control element 216a may be configured to adjust the gain of the BUC 100 in response to the gain compensation value GVAL_A. The control system 108 may be configured to present the gain compensation value GVAL_A to the gain control element 216a.

The gain control element 216b is shown implemented as a component of the signal conditioning circuitry 170. The gain control element 216b may be one component of the BUC 100 that may be configured to adjust the gain in order to maintain a target gain value over a range of an operating condition. The gain control element 216b may be configured to adjust the gain of the BUC 100 in response to the gain compensation value GVAL_B. The control system 108 may be configured to present the gain compensation value GVAL_B to the gain control element 216b.

In the example shown, the sensor circuits 212a-212c are shown measuring power and the sensor circuits 214a-214b are shown as temperature sensors. In some embodiments, one or more of the sensor circuits 212a-212c may implement temperature sensors. In some embodiments, one or more of the sensor circuits 214a-214b may measure power. In some embodiments, one or more of the sensor circuits 212a-212c and/or the sensor circuits 214a-214b may implement current monitors and measure a current at particular location in the BUC 100. In some embodiments, one or more of the sensor circuits 212a-212c and/or the sensor circuits 214a-214b may implement voltage monitors and measure a voltage at a particular location in the BUC 100. While the sensor circuits 212a-212c and the sensor circuits 214a-214b are shown as an illustrative example, the BUC 100 may implement any number of sensor circuits (e.g., the sensor circuits 212a-212n and/or the sensor circuits 214a-214n). The sensor circuits 212a-212n and/or the sensor circuits 214a-214n may comprise measurement devices configured to generate one or more measurement values. The combination of sensor circuits used, the number of sensor circuits implemented, and the location that the sensor circuits perform the measurement may be varied according to the design criteria of a particular implementation.

In the example shown, the gain control elements 216a-216b may be configured to perform the gain compensation in response to the gain configuration signals GVAL_A-GVAL_B. Two gain control elements 216a-216b are shown as an illustrative example. The BUC 100 may comprise any number of gain control elements (e.g., gain control elements 216a-216m). The gain control elements 216a-216m may comprise amplifiers, attenuators and/or a combination of amplifiers and attenuators. The control system 108 may generate respective gain configuration values GVAL_A-GVAL_M for the number of gain control elements 216a-216m implemented in order to control the overall gain of the BUC 100. The number, type and/or location of the gain control elements 216a-216m may be varied according to the design criteria of a particular implementation.

Figure 6:
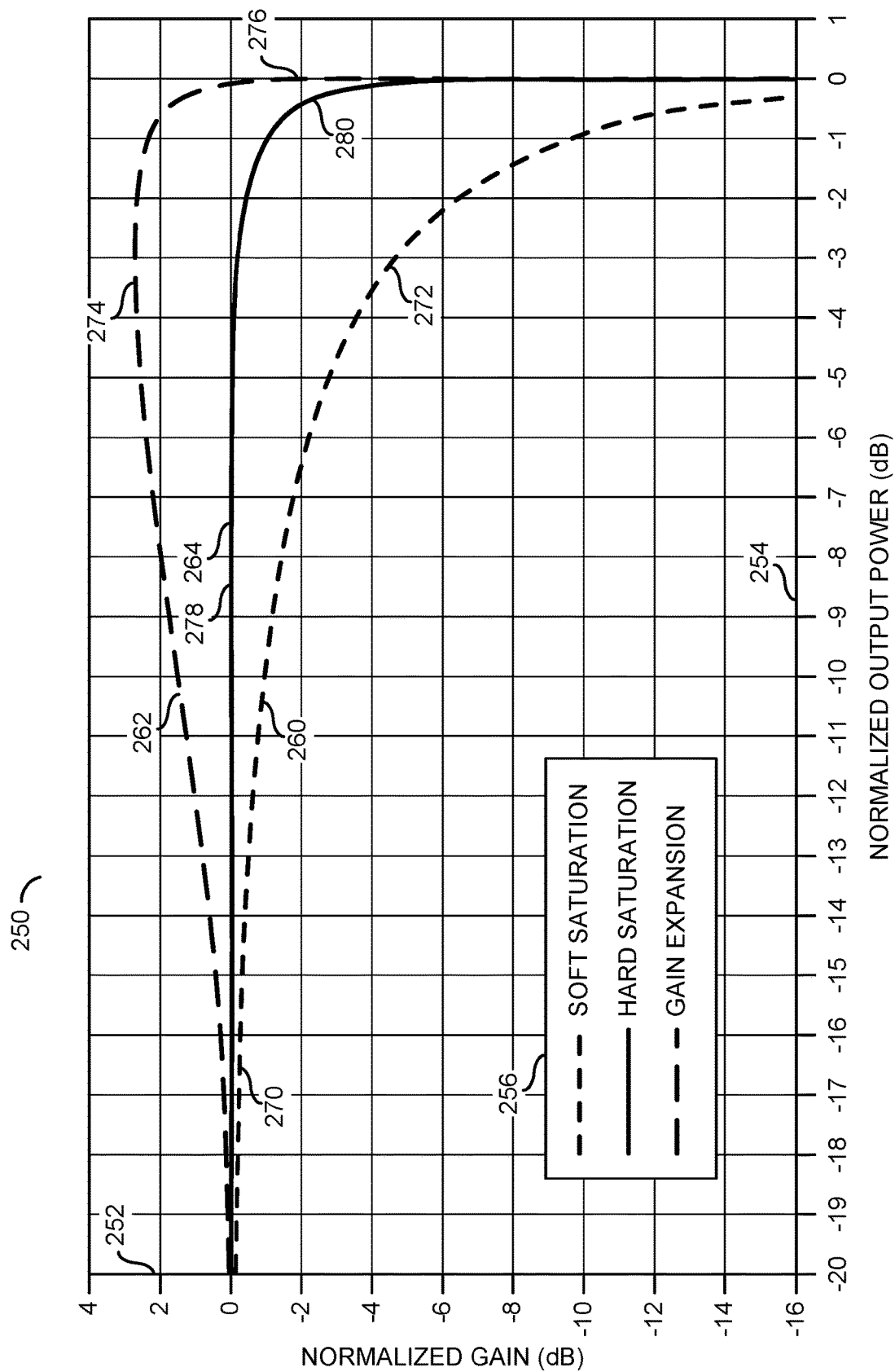
FIG. 6 is a graph illustrating gain saturation curves of a satcom BUC.

Referring to FIG. 6, a graph illustrating gain saturation curves of a satcom BUC is shown. A graph 250 is shown. The graph 250 may comprise a y-axis 252 and an x-axis 254. The y-axis 252 may illustrate relative gain values measured in decibels (dB). The x-axis 254 may illustrate a relative output power of the signal RFOUT measured in decibels.

The y-axis 252 is shown having a range from −16 dB to +4 dB. The x-axis 254 is shown having a range from −20 dB to +1 dB. A legend 256 is shown.

The graph 250 may comprise a curve 260, a curve 262, and a curve 264. The curve 260 and the curve 262 may illustrate a gain curve when performing the gain compensation using the temperature measurement TVAL alone. The curve 264 may illustrate an example gain curve generated by the BUC 100 implementing the gain compensation using the temperature value TVAL and at least one of the sensor values SVAL_A-SVAL_N. The curve 260, the curve 262, and the curve 264 may illustrate a gain saturation. The curve 260, the curve 262, and the curve 264 may be measured adiabatically (e.g., allowing the BUC 100 to reach equilibrium at each point).

The curve 260 may illustrate a soft gain curve. The curve 262 may illustrate an expansion gain curve. Depending on the details of the temperature compensation using the temperature measurement TVAL alone, a gain saturation curve may appear as soft (e.g., the curve 260) or, alternatively, the gain saturation curve may show gain expansion (e.g., the curve 262).

The soft gain curve 260 may comprise a relatively flat region 270 and a saturated region 272 when gain compensation is performed using the temperature value TVAL alone. In the flat region 270, the gain may be approximately 0 dB. The flat region 270 may gradually curve into the saturated region 272. The relative gain of the curve 260 may decrease by approximately 10 dB when the relative output power increases from −20 dB to −1 dB. The soft gain curve 260 may gradually enter the saturated region 272 and may have a relatively short flat region 270 (e.g., a substantially constant gain may not be maintained).

The expansion curve 262 may comprise an expanded region 274 and a saturated region 276 when gain compensation is performed using the temperature value TVAL alone. The expanded region 274 may comprise a gain increase of approximately 3 dB when the relative output power increases from −20 dB to −1 dB. After the expanded region 274 (e.g., a relative output power of approximately −1 dB), the saturated region 276 may drop off rapidly.

The gain curve 264 may comprise a constant region 278 and a saturation region 280. The gain curve 264 may provide a hard gain saturation curve when using the temperature value TVAL and one or more of the sensor values SVAL_A-SVAL_N to perform the gain compensation. The constant region 278 may provide a relatively constant gain over a wide range of output power operation. The relative gain of the curve 264 may decrease by approximately 1 dB when the relative output power increases from −20 dB to −1 dB. The overall gain of the curve 264 may comprise a more stable gain value and may drop approximately 1 dB over the same output power range as the curve 260 and the curve 262, with most of the gain change happening near the higher output powers.

The result is that the gain curve 260 and the gain curve 262 may be more dependent on output power than the gain curve 264. The gain decreases as the output reaches the maximum saturated output power of the final power amplifier 172. However, thermal effects may exacerbate the effect. As the BUC 100 is driven harder, the final power amplifier 172 may dissipate more power and heat up. As shown in the soft gain curve 260, as the power amplifier 172 dissipates more power and heats up, the gain curve of the overall gain of the BUC 100 may soften. Alternatively, as shown in the expansion gain curve 262, the temperature compensation system 152 of the BUC 100 may overcompensate for the power amplifier 172 heating, and the overall gain of the BUC 100 may show gain expansion. A hard saturation curve, such as the curve 264, may be generally preferable (e.g., the gain may be constant over much of the output power and the output may track the input at a dB-for-dB ratio for much of the dynamic range of the upconverter 102).

The shape of the saturation curve of the BUC 100 may depend on the amount of time taken to perform the measurement. If the measurement is very fast (e.g., on the order of a few seconds), the gain curve may appear harder because the BUC 100 does not have time to heat up and cool down. If the measurement is very slow and the BUC 100 has time to reach thermal equilibrium the gain curve may appear much softer or may show gain expansion.

Figure 7:
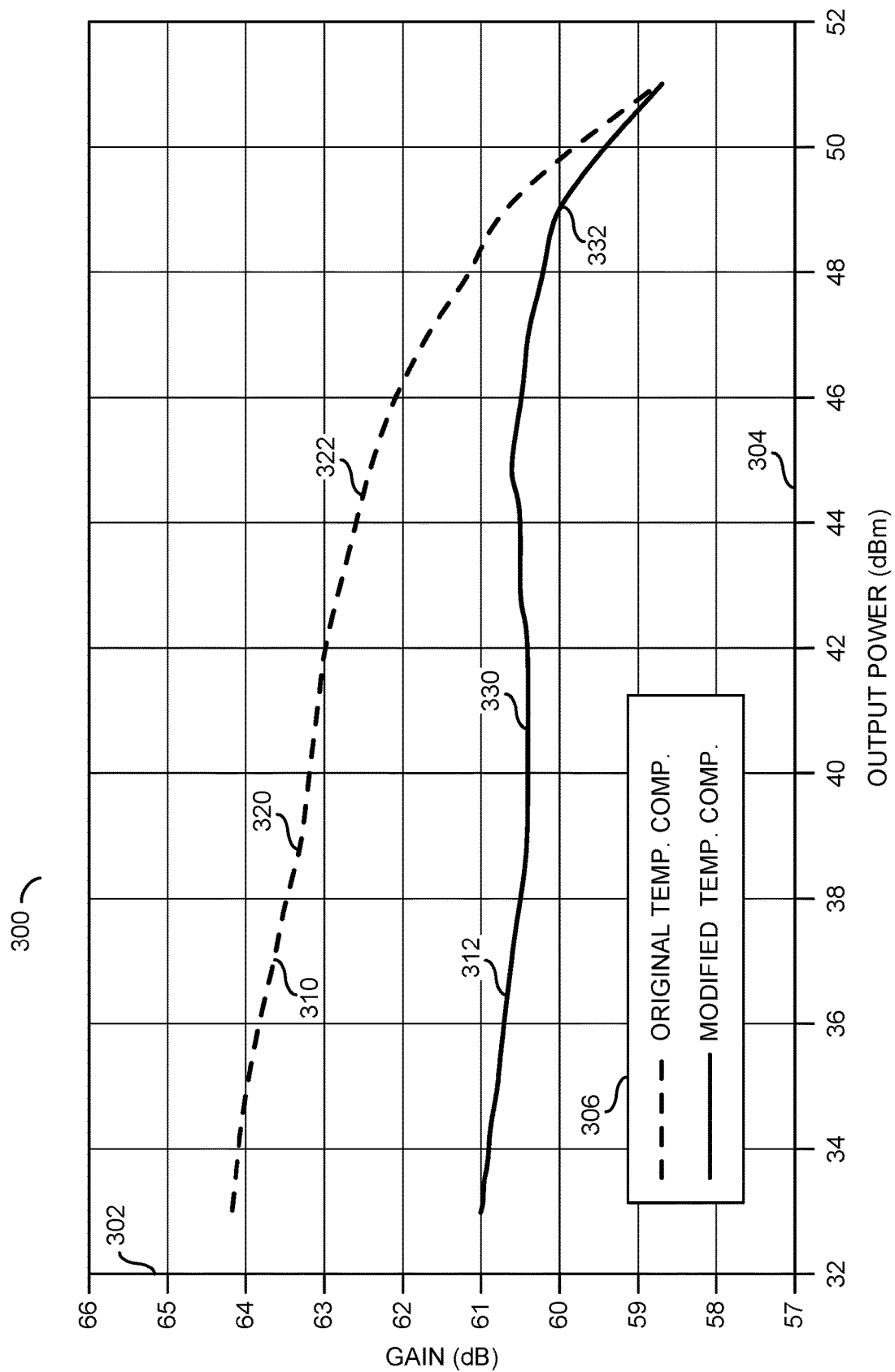
FIG. 7 is a graph illustrating a measured gain saturation curve in response to a gain compensation.

Referring to FIG. 7, a graph illustrating a measured gain saturation curve in response to a gain compensation is shown. A graph 300 is shown. The graph 300 may comprise a y-axis 302 and an x-axis 304. The y-axis 302 may illustrate gain values measured in decibels (dB). The x-axis 304 may illustrate an output power of the signal RFOUT measured in decibel milliwatts (dBm). The y-axis 302 is shown having a range from 57 dB to 66 dB. The x-axis 304 is shown having a range from 32 dBm to 52 dBm. A legend 306 is shown.

The graph 300 may comprise a curve 310 and a curve 312. The curve 310 may illustrate a gain curve when performing compensation using the temperature measurement TVAL alone. The curve 312 may illustrate an example gain curve generated by the BUC 100 implementing the gain compensation using the temperature value TVAL and at least one of the sensor values SVAL_A-SVAL_N. The curve 310 and the curve 312 may illustrate a gain saturation. The curve 310 and the curve 312 may be measured adiabatically (e.g., allowing the BUC 100 to reach equilibrium at each point). The values of the curves 310-312 may be real measured data. However, the real measured data may be a representative example of the response of the BUC 100. The measured values of the curves 310-312 may be varied according to design parameters, equipment sensitivity, components implemented by the BUC 100, etc.

The curve 310 may comprise a flat region 320 and a soft saturation region 322. The gain curve 310 may provide a soft curve when using the temperature value TVAL alone. The flat region 320 of the gain curve 310 may still comprise an output power decrease. In the example shown, the flat region 320 may be from approximately 33 dBm to 44 dBm, with a gain decrease of 2 dB. The soft saturation region 322 may comprise a relatively sharper dropoff. The soft saturation region 322 may be from approximately a power output of 45 dBm to 51 dBm, with a gain decrease of 3.5 dB. For the curve 310, the soft saturation region 322 may provide a slightly sharper dropoff than the flat region 320. However, overall, the gain may drop steadily (non-constant gain over output power). The curve 310 may have a gain increase of 5.5 dB as the output power decreases from 51 dBm to 33 dBm.

The curve 312 may comprise a constant region 330 and a hard saturation region 332. The gain curve 312 may provide a hard gain saturation curve when using the temperature value TVAL and one or more of the sensor values SVAL_A-SVAL_N to perform the gain compensation. The constant region 330 may provide a relatively constant gain over a wide range of output power operation. The gain of the constant region 330 may be within 60 dB-61 dB over a power output of 33 dBm to 49 dBm (e.g., approximately a 1 dB decrease in gain over a larger range out output power compared to the soft curve 310). The hard saturation region 332 may comprise a harder dropoff after 49 dBm. The gain may drop approximately 1 dB from an output power of 49 dBm to 51 dBm. The curve 312 may provide a much harder saturation curve than the curve 310. While the hard saturation region 332 may have a faster gain drop than the soft saturation region 322, the overall gain of the curve 312 may comprise a more stable gain value and may only drop 2.3 dB over the same output power range as the curve 310, with most of the gain change happening near the higher output powers.

The result is that the gain curves 310-312 may depend on output power. The gain must decrease as the output reaches the maximum saturated output power of the final power amplifier 172. However, thermal effects may exacerbate the effect. As the BUC 100 is driven harder, the final power amplifier 172 may dissipate more power, heat up, and the gain may decrease. As the power amplifier 172 dissipates more power and heats up, the gain curve of the overall gain of the BUC 100 may soften. A hard saturation curve, such as the curve 312 may be generally preferable (e.g., the gain may be constant over much of the output power and the output may track the input at a dB-for-dB ratio for much of the dynamic range of the upconverter 102).

The shape of the saturation curve of the BUC 100 may depend on the amount of time taken to perform the measurement. If the measurement is very fast (e.g., on the order of a few seconds), the gain curve may appear harder because the BUC 100 does not have time to heat up and cool down. If the measurement is very slow and the BUC 100 has time to reach thermal equilibrium the gain curve may appear much softer. Using one or more of the sensor values SVAL_A-SVAL_N in addition to the TVAL in order to adjust the gain to the target level may decrease a dependency of the resulting gain curve on the time needed to perform the measurements. For example, with improved gain compensation using the temperature measurement and at least one additional sensor value, the response of the gain curve may be similar regardless of whether the measurements are performed quickly or slowly, which may improve overall performance of the BUC 100.

Figure 8:
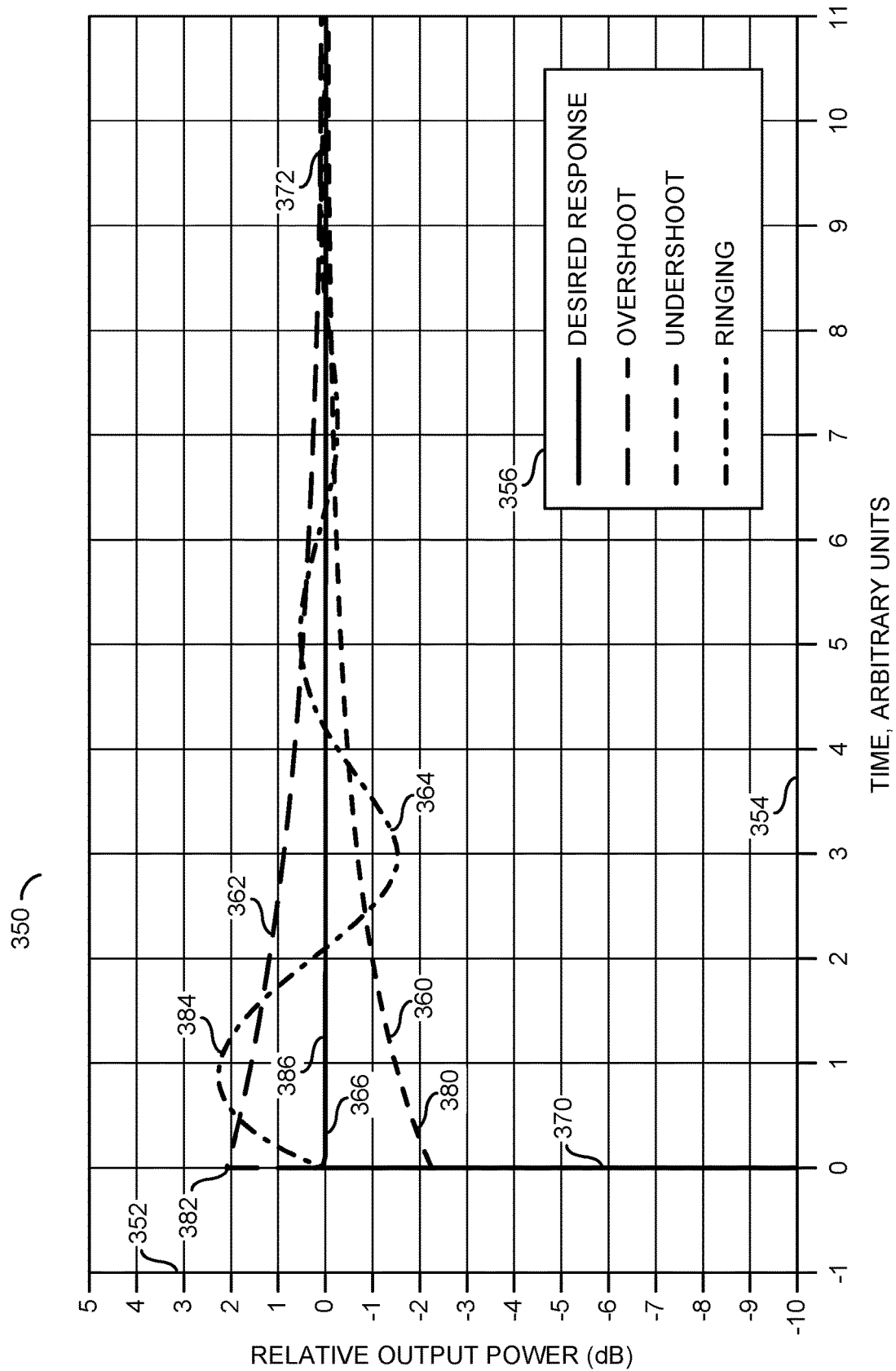
FIG. 8 is a graph illustrating transient responses of a satcom BUC.

Referring to FIG. 8, a graph illustrating transient responses of a satcom BUC is shown. A graph 350 is shown. The graph 350 may comprise a y-axis 352 and an x-axis 354. The y-axis 352 may illustrate a relative output power of the signal RFOUT measured in decibels (dB). The x-axis 354 may illustrate time. The y-axis 352 is shown having a range from 5 dB to −10 dB. The x-axis 354 is shown having a range from −1 to 11. A legend 356 is shown.

The graph 350 may comprise a curve 360, a curve 362, a curve 364 and a curve 366. The curves 360-364 may illustrate a transient response of output power when performing compensation using the temperature measurement TVAL alone. The curve 366 may illustrate a transient response generated by the BUC 100 implementing the gain compensation using the temperature value TVAL and at least one of the sensor values SVAL_A-SVAL_N.

Each of the curves 360-366 may comprise a transient 370. The transient 370 may comprise a sudden change in the output power of the output signal RFOUT. In one example, the transient 370 may result from a sudden change in input power of the signal IFIN. In another example, the transient 370 may result from the BUC 100 being muted and unmuted. Each of the curves 360-366 may comprise a settling value 372. The settling value 372 may be a steady gain value that occurs some time after the transient 370. In the example shown, the transient 370 may be a sudden change in output power from approximately −10 dB to the settling value 372 of approximately 0 dB.

The curve 360 may illustrate an undershoot transient response. The undershoot curve 360 may comprise an undershoot region 380. The undershoot region 380 may comprise an amount of time after the transient 370 for the undershoot curve 360 to reach the settling value 372 where the undershoot curve 360 remains below the settling value 372. In the example shown, the undershoot region 380 may be a range of −2 dB to the settling value 372 of 0 dB. In the example shown, the undershoot region 380 may last approximately six units of time after the transient 370. For the undershoot region 380, the gain may not be at the target level over a range of the operating conditions.

The curve 362 may illustrate an overshoot transient response. The overshoot curve 362 may comprise an overshoot region 382. The overshoot region 382 may comprise an amount of time after the transient 370 for the overshoot curve 362 to reach the settling value 372 where the overshoot curve 362 remains above the settling value 372. In the example shown, the overshoot region 382 may be a range from a peak value of 2 dB to the settling value 372 of 0 dB. In the example shown, the overshoot region 382 may last approximately six units of time after the transient 370. For the overshoot region 382, the gain may not be at the target level over a range of the operating conditions.

The curve 364 may illustrate a ringing (or oscillating) transient response. The ringing curve 364 may comprise an oscillating region 384. The oscillating region 384 may comprise an amount of time after the transient 370 for the ringing curve 364 to reach the settling value 372 where the ringing curve 364 oscillates above and below the settling value 372 in an exponentially decaying (e.g., damped) sinusoidal pattern. In the example shown, the oscillating region 384 may be a range 2 dB above to −1.5 dB below the settling value 372 of 0 dB. In the example shown, the oscillating region 384 may last approximately six units of time after the transient 370. For the oscillating region 384, the gain may not be at the target level over a range of the operating conditions.

The curve 366 may illustrate a transient response with the compensation performed by the BUC 100. The compensated curve 366 may comprise a constant region 386. The constant region 386 may be substantially constant at the target level. After the transient 370, the compensated curve 366 may settle in the constant region 386 near the settling value 372 of 0 dB. The compensation performed by the BUC 100 may prevent (or limit) overshoot, undershoot and/or ringing in the transient response. The compensated curve 366 using the gain compensation based on the temperature value TVAL and one or more of the sensor values SVAL_A-SVAL_N may approach the settling value 372 faster that the curves 360-364 that compensate based on the temperature value alone. For example, the compensated curve 366 may be illustrate that the gain compensation performed by the BUC 100 may enable the settling value 372 (e.g., a quiescent value) to be reached without observing a significant amount of an overshoot, an undershoot, and/or an amount of oscillation of the output power. The amount of time for the compensated curve 366 to settle to the settling value 372 may depend on the number of sensor values SVAL_A-SVAL_N measured and used in the pre-determined calculation (e.g., additional measurements may provide a faster settling time at the cost of increased complexity).

Figure 9:
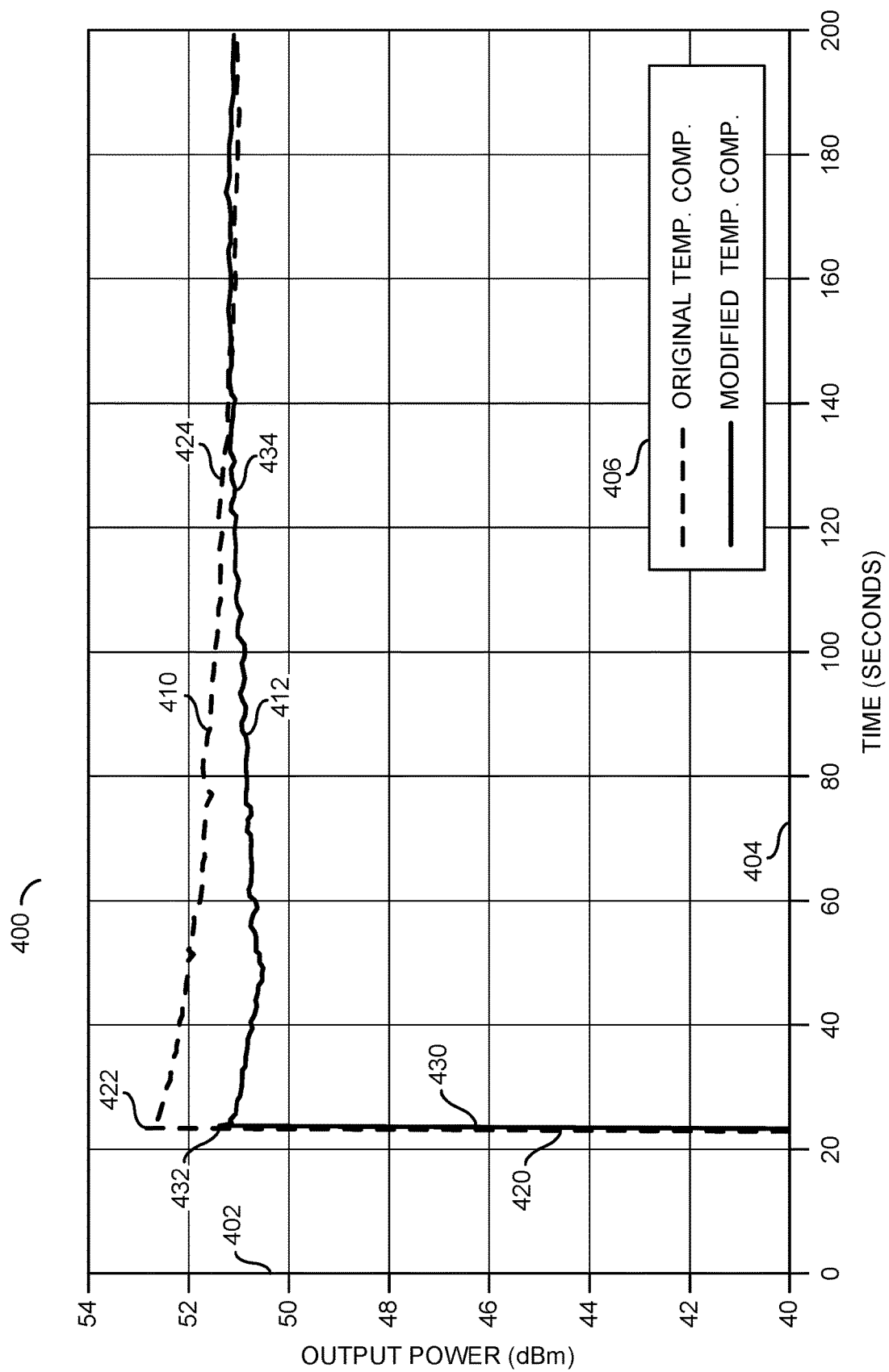
FIG. 9 is a graph illustrating a measured transient response when a gain compensation is implemented.

Referring to FIG. 9, a graph illustrating a measured transient response when a gain compensation is implemented is shown. A graph 400 is shown. The graph 400 may comprise a y-axis 402 and an x-axis 404. The y-axis 402 may illustrate an output power of the signal RFOUT measured in decibel milliwatts (dBm). The x-axis 404 may illustrate time measured in seconds. The y-axis 402 is shown having a range from 40 dBm to 54 dBm. The x-axis 404 is shown having a range from 0 to 200 s. A legend 406 is shown.

The graph 400 may comprise a curve 410 and a curve 412. The curve 410 may illustrate a transient response of output power when performing compensation using the temperature measurement TVAL alone. The curve 412 may illustrate a transient response generated by the BUC 100 implementing the gain compensation using the temperature value TVAL and at least one of the sensor values SVAL_A-SVAL_N. The values of the curves 410-412 may be real measured data. However, the real measured data may be a representative example of the response of the BUC 100. The measured values of the curves 410-412 may be varied according to design parameters, equipment sensitivity, components implemented by the BUC 100, etc.

The effects of changing internal temperatures in the BUC 100 may be seen by tracking the output power as a function of time, as shown in the graph 400. For example, the power amplifier 172 may be driven from zero to near saturation suddenly. As the internal temperatures settle and the control system 108 attempts to perform the gain compensation, the observed output power may overshoot, undershoot, or even oscillate about the steady-state power before settling at equilibrium. The gain compensation performed by the BUC 100 may prevent and/or reduce overshoot and undershoot. The transient response 410 and the compensated transient response 412 may illustrate an example of the input power being suddenly increased and the monitored output power over time.

The transient response 410 may comprise a transient 420, a peak 422 and a quiescent region 424. The transient 420 may represent a sudden change in output power. The peak 422 may represent an overshoot of the output power. The peak 422 may reach approximately 53 dBm. The quiescent region 424 may represent the settled output power at a quiescent value. The quiescent value for the quiescent region 424 may be approximately 51 dBm. With the gain compensation performed using the temperature value TVAL alone, the output power for the transient response 410 may have an output power overshoot of approximately 2 dB before settling to the quiescent value after over a minute has passed (e.g., approximately 100 seconds pass before reaching the quiescent value).

The compensated transient response 412 may comprise a transient 430, a peak 432 and a quiescent region 434. The transient 430 may represent a sudden increase in the output power. The peak 432 may represent an overshoot of the output power. The peak 432 may reach approximately 51.5 dBm. The quiescent region 434 may represent the settled output power at a quiescent value. The quiescent value for the quiescent region 434 may be approximately 51 dBm. With the gain compensation performed using the temperature value TVAL and one or more of the sensor values SVAL_A-SVAL_N, the output power for the transient response 430 may have an output power overshoot within 0.5 dB if its steady-state value (e.g., very little overshoot). The compensated transient response 412 may reach the quiescent value of 51 dBm within approximately 30-40 seconds. The compensated transient response 412 may settle much faster and with less variance in the output power compared to the transient response 410.

Figure 10:
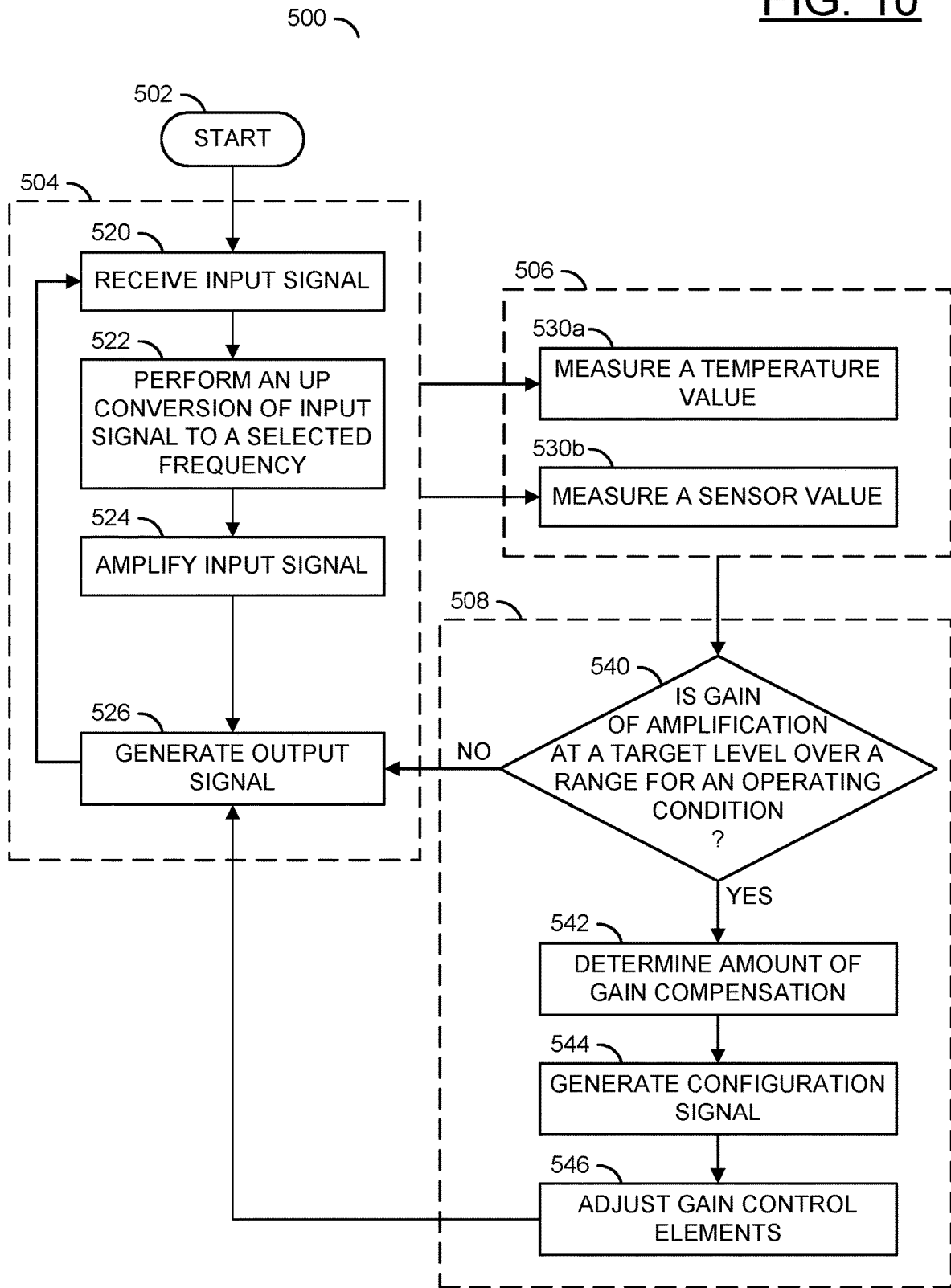
FIG. 10 is a flow diagram illustrating performing multivariate gain compensation.

Referring to FIG. 10, a method (or process) 500 is shown. The method 500 may perform multivariate gain compensation. The method 500 generally comprises a step (or state) 502, a step (or state) 504, and a step (or state) 508.

The step 502 may start the method 500. The step 504 may comprise an upconversion and amplification sub-process. The upconversion and amplification sub-process 504 may comprise a step (or state) 520, a step (or state) 522, a step (or state) 524, and a step (or state) 526. The step 506 may comprise a sensor measurement sub-process. The sensor measurement sub-process 506 may comprise a step (or state) 530a, and a step (or state) 530b. The step 508 may comprise a gain compensation sub-process. The gain compensation sub-process 508 may comprise a decision step (or state) 540, a step (or state) 542, a step (or state) 544, and a step (or state) 546. The steps of the sub-processes 504-508 may be performed sequentially, in parallel, partially in parallel, independent from each other and/or dependent on each other based on the design criteria of a particular implementation.

The upconversion and amplification sub-process 504 may be a main process configured to receive the input signal IFIN and generate the output signal RFOUT. In the step 520, the upconverter 102 may receive the input signal IFIN. For example, the signal IFIN may be presented by the modem 52 as an input to the intermediate frequency signal amplifier 160. Next, in the steps 522-524, the upconverter 102 may perform an upconversion of the input signal IFIN to a selected frequency and amplify the input signal IFIN. The upconversion and the amplification may be performed by the components 160-172. For example, the mixer 164 may upconvert the intermediate frequency signal to a selected frequency band and the amplifier 160, the amplifier 168 and the amplifier 172 may perform amplification. In the step the upconverter 102 may generate the radio-frequency output signal RFOUT. For example, the output signal RFOUT may be presented by the power amplifier 172. Next, the sub-process 504 may return to the step 520. While the steps 520-526 may be shown sequentially, the upconverter 102 may continually receive the input signal IFIN and generate the output signal RFOUT by performing the upconversion and amplification.

The sensor measurement sub-process 506 may be configured to perform measurements based on various components and/or signals of the BUC 100 while BUC 100 performs the upconversion and amplification. For example, the sensor measurement sub-process 506 may be configured to read data without interrupting the upconversion and amplification sub-process 504. In the step 530a, the temperature sensor 210 may measure the temperature value TVAL. In the step 530b, the sensor circuits 212a-212n and/or the sensor circuits 214a-214n may measure the sensor values SVAL_A-SVAL_N. The steps 530a-530b of the sensor measurement sub-process 506 may be performed in parallel and/or substantially in parallel. The order that the temperature value TVAL and the sensor values SVAL_A-SVAL_N are generated may depend on the location of the temperature sensor 210, the sensor circuits 212a-212n and/or the sensor circuits 214a-214n in the BUC 100. The temperature value TVAL and/or the sensor values SVAL_A-SVAL_N may be presented as input to the gain compensation sub-process 508.

The gain compensation sub-process 508 may be configured to calculate the gain compensation for the upconverter 102 while BUC 100 performs the upconversion and amplification. The upconverter 102 may be configured to generate the output signal RFOUT independent from the gain compensation sub-process 508. The gain compensation sub-process 508 may be configured to receive the temperature value TVAL and/or the sensor values SVAL_A-SVAL_N generated by the sensor measurement sub-process 506 in order to calculate the gain compensation for augmenting the upconversion and amplification sub-process 504.

The gain compensation sub-process 508 may be initiated in the decision step 540 in response to the measurement of the temperature value TVAL and one or more of the sensor values SVAL_A-SVAL_N. In the decision step 540, the control system 108 may determine whether the gain of the amplification performed by the upconverter 102 is at a target level over a range for an operating condition(s). For example, the control system 108 may receive the temperature measurement TVAL and one or more of the sensor values SVAL_A-SVAL_N and perform the pre-determined calculation to determine the overall gain based on the multiple variables. If the overall gain is at the target level, then the gain compensation sub-process 508 may move to the step 526. For example, the output signal RFOUT may be generated without additional compensation. The gain compensation sub-process 508 may remain in the decision step 540. If the overall gain is not at the target level, then the gain compensation sub-process 508 may move to the step 542.

In the step 542, the control system 108 may determine an amount of gain compensation to perform. In one example, the gain compensation may be determined by the processor 180 performing the pre-determined calculation in response to executing computer readable instructions 202 comprising a first variable for the temperature value TVAL and one or more variables for the sensor values SVAL_A-SVAL_N. In another example, the gain compensation may be determined by the processor 180 accessing the lookup table 204 using the temperature value TVAL and one or more of the sensor values SVAL_A-SVAL_N. Next, in the step 544, the control system 108 may generate one or more of the gain configuration signals GVAL_A-GVAL_M. The gain configuration signals GVAL_A-GVAL_M may be presented to one or more of the gain control elements 216a-216m. In the step 546, the gain control elements 216a-216m may be adjusted in order to perform the gain compensation. Next, the method 500 may move to step 526 to generate the output signal RFOUT with the gain compensation.

The functions performed by the diagrams of FIGS. 1-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a circuit configured to (i) receive an input signal and a configuration signal and (ii) generate an output signal in response to (a) a conversion of said input signal and (b) an amplification of said input signal in response to a gain and said configuration signal;
   a temperature sensor configured to measure a temperature value;
   a sensor circuit configured to measure a sensor value; and
   a control system configured to generate said configuration signal in response to (i) said temperature value and (ii) said sensor value, wherein
   (a) said configuration signal is generated to maintain said gain of said amplification at a target level over a range of one or more operating conditions of said apparatus during said conversion,
   (b) said target level of said gain over said range of said operating conditions is determined in response to a pre-determined calculation, and
   (c) said pre-determined calculation enables said configuration signal to adjust said amplification to prevent changes of said one or more operating conditions from having an effect on said gain.

2. The apparatus according to claim 1, wherein (i) said conversion comprises a downconversion of said input signal, (ii) said apparatus further comprises a power amplifier, a downconverting mixer and at least one gain control element, (iii) said gain control element is configured to adjust said gain in response to said configuration signal and (iv) said control system comprises a monitor configured to read said temperature value and said sensor value.

3. The apparatus according to claim 2, wherein said apparatus is a solid-state block downconverter of a satellite communications system.

4. The apparatus according to claim 1, wherein (i) said conversion of said input signal is to a selected frequency band and (ii) said selected frequency band comprises at least one of (a) an X-band frequency, (b) a Ku-band frequency and (c) a Ka-band frequency.

5. The apparatus according to claim 1, wherein said sensor circuit comprises a power detector configured to measure an output power of said output signal as said sensor value.

6. The apparatus according to claim 1, wherein said sensor circuit comprises a power detector configured to measure an input power of said input signal as said sensor value.

7. The apparatus according to claim 1, wherein said sensor circuit comprises a power detector configured to measure an intermediate power level of said apparatus as said sensor value.

8. The apparatus according to claim 1, wherein said sensor circuit comprises a voltage monitor configured to measure a voltage as said sensor value.

9. The apparatus according to claim 1, wherein said sensor circuit comprises a current monitor configured to measure a current as said sensor value.

10. The apparatus according to claim 1, wherein (i) said effect of said one or more operating conditions on said gain is a thermal effect and (ii) said thermal effect is caused by a difference between a rapid heating rate of a power amplifier compared with a heating of a different rate of other components of said apparatus.

11. The apparatus according to claim 1, wherein said sensor circuit comprises a voltage monitor configured to measure a voltage at a power amplifier as said sensor value.

12. The apparatus according to claim 1, wherein said sensor circuit comprises a current monitor configured to measure a current at a power amplifier as said sensor value.

13. The apparatus according to claim 1, wherein (i) said conversion comprises an upconversion of said input signal, and (ii) said apparatus is a solid-state block upconverter of a satellite communications system.

14. An apparatus comprising:
   a circuit configured to (i) receive an input signal and a configuration signal and (ii) generate an output signal in response to (a) a conversion of said input signal and (b) an amplification of said input signal in response to a gain and said configuration signal;

a temperature sensor configured to measure a temperature value;

a sensor circuit configured to measure a sensor value; and a control system configured to generate said configuration signal in response to (i) said temperature value and (ii) said sensor value, wherein (a) said configuration signal is generated to maintain an output power of said apparatus at a target level over a range of one or more operating conditions of said apparatus during said conversion, (b) said target level of said output power over said range of said operating conditions is determined in response to a pre-determined calculation, and (c) said pre-determined calculation enables said configuration signal to adjust said amplification to prevent changes of said one or more operating conditions from having an effect on said output power.

15. The apparatus according to claim 14, wherein (i) said apparatus further comprises a power amplifier, a converting mixer and at least one gain control element, (ii) said gain control element is configured to adjust said gain in response to said configuration signal and (iii) said control system comprises a monitor configured to read said temperature value and said sensor value.

16. The apparatus according to claim 15, wherein said apparatus is a solid-state block converter of a satellite communications system.

17. The apparatus according to claim 15, wherein said sensor circuit comprises a voltage monitor configured to measure a voltage at said converting mixer as said sensor value.

18. The apparatus according to claim 15, wherein said sensor circuit comprises a current monitor configured to measure a current at said converting mixer as said sensor value.

19. The apparatus according to claim 14, wherein said sensor circuit comprises a power detector configured to measure said output power of said output signal as said sensor value.

20. A method for maintaining a gain over a range of operating conditions in a communications system, comprising the steps of:

receiving an input signal and a configuration signal;

generating an output signal in response to (a) a conversion of said input signal to a selected frequency band and (b) an amplification of said input signal in response to a gain and said configuration signal;

measuring a temperature value using a temperature sensor;

measuring a sensor value using a sensor circuit; and generating said configuration signal in response to (i) said temperature value and (ii) said sensor value, wherein (a) said configuration signal is generated to maintain said gain of said amplification at a target level over a range of one or more operating conditions during said conversion, (b) said target level of said gain over said range of said operating conditions is determined in response to a pre-determined calculation, and (c) said pre-determined calculation enables said configuration signal to adjust said amplification to prevent changes of said one or more operating conditions from having an effect on said gain.

\* \* \* \* \*